United States Patent
Tokoro et al.

(10) Patent No.: US 7,671,820 B2
(45) Date of Patent: Mar. 2, 2010

(54) LUNEBERG DIELECTRIC LENS AND METHOD OF PRODUCING SAME

(75) Inventors: Hisao Tokoro, Tochigi (JP); Kazutoshi Sasaki, Imaichi (JP); Mitsuru Shinohara, Kanuma (JP); Masakazu Sakaguchi, Tokyo (JP); Masatoshi Kuroda, Osaka (JP); Koichi Kimura, Osaka (JP); Yoshiyuki Ishibashi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 84 days.

(21) Appl. No.: 11/662,262

(22) PCT Filed: Sep. 8, 2005

(86) PCT No.: PCT/JP2005/016987

§ 371 (c)(1),
(2), (4) Date: Oct. 11, 2007

(87) PCT Pub. No.: WO2006/028272

PCT Pub. Date: Mar. 16, 2006

(65) Prior Publication Data

US 2008/0191952 A1     Aug. 14, 2008

(30) Foreign Application Priority Data

Sep. 10, 2004     (JP) .............................. 2004-264109

(51) Int. Cl.
*H01Q 25/00* (2006.01)

(52) U.S. Cl. ............................. 343/911 L; 343/911 R; 343/753

(58) Field of Classification Search ................ 343/753, 343/911 R, 911 L
See application file for complete search history.

(56) References Cited

U.S. PATENT DOCUMENTS

| 2,943,358 | A | * | 7/1960 | Hutchins et al. ............ 264/113 |
| 4,482,513 | A | | 11/1984 | Auletti |
| 6,433,936 | B1 | | 8/2002 | Carpenter et al. |
| 2004/0029985 | A1 | | 2/2004 | Aki et al. |

FOREIGN PATENT DOCUMENTS

| DE | 44 00 864 A1 | 7/1995 |
| EP | 0 963 827 A2 | 12/1999 |
| GB | 1125828 | 9/1968 |
| JP | 7-320537 A | 12/1995 |

* cited by examiner

*Primary Examiner*—Trinh V Dinh
*Assistant Examiner*—Dieu Hien T Duong
(74) *Attorney, Agent, or Firm*—McDermott Will & Emery LLP

(57) ABSTRACT

A hemispherical Luneberg dielectric lens including a hemispherical center layer having a hemispherical outer surface, and a plurality of hemispherical dome-shaped layers each having concentric hemispherical inner and outer surfaces, the outer surfaces of the center layer and dome-shaped layers having different diameters and the inner surfaces of said dome-shaped layers having different diameters. The center layer and dome-shaped layers are successively concentrically fitted into one another and integrated into a hemispherical shape. The center layer is a foam molding of ceramic-containing thermoplastic resin expanded beads, while each of said dome-shaped layers is a foam molding of thermoplastic resin expanded beads containing 0 to 80% by weight of a ceramic. The ceramic content per unit volume of the center and dome-shaped layers decreases from the center layer to the outermost dome-shaped layer, and the standard deviation of the apparent density of each of the center and dome-shaped layers is 0.07 g/cm3 or lower.

8 Claims, 6 Drawing Sheets

LUNEBERG DIELECTRIC LENS AND METHOD OF PRODUCING SAME

RELATED APPLICATIONS

This application is the U.S. National Phase under 35 U.S.C. § 371 of International Application No. PCT/JP2005/016987, filed on Sep. 8, 2005, which in turn claims the benefit of Japanese Application No. 2004-264109, filed on Sep. 10, 2004, the disclosures of which Applications are incorporated by reference herein.

TECHNICAL FIELD

This invention relates to a dielectric lens. More specifically, the present invention relates to a hemispherical Luneberg dielectric lens in which a hemispherical, ceramic-containing foam center layer and a plurality of hemispherical, dome-shaped foam layers are concentrically stacked and in which the ceramic content per unit volume of each layer is adjusted. The present invention is also directed to a method of producing a series of foam moldings for use in fabrication of a dielectric lens.

BACKGROUND ART

With the remarkable development of information communication technology and increase of the amount of information in recent years, more precision and more quickness are required for the transmission of signal information. Along with this, the use of high frequency bands is rapidly increasing. In particular, the full-scale use of the frequency band over 1 GHz, especially, a frequency band between 10 to 20 GHz, has been started. As a result, in satellite broadcasting and satellite communication, a method for transmitting and receiving radio waves with Luneberg lens antennas is expected to be developed as an alternative to the conventional method using parabolic antennas.

In the conventional system of satellite broadcasting and satellite communication using parabolic antennas, a geostationary satellite is used in combination with a parabolic antenna oriented in fixed direction to transmit and receive radio waves. With this system, in order to transmit and receive radio waves to and from a plurality of satellites, it is necessary to change the orientation of the antenna depending on the location of the target satellite or to use a plurality of parabolic antennas. On the contrary, a Luneberg lens antenna (a spherical or hemispherical antenna provided with a Luneberg dielectric lens) can transmit and receive radio waves to and from a plurality of stationary satellites when a plurality of feeds are located on the focal position of the Luneberg lens on a cover of the antenna. Also, when a satellite or antenna as a target of communication moves as in the case of a low earth orbit satellite (LEO), the entire antenna should track the target in the case of a parabolic antenna whereas, in the case of a Luneberg lens antenna, only a small component thereof such as a receiver or transmitter should track the target. Thus, a Luneberg lens antenna does not require a large driving system and is also suitable as an antenna for a mobile body. According to the method using a Luneberg lens antenna, a large amount of information can be transmitted and received with one antenna in each residence. That is, a Luneberg lens antenna is also suitable as an antenna for receiving TV broadcasts in the age of multi-channel broadcasting.

A Luneberg lens antenna is provided with a Luneberg dielectric lens having a function of converging and focusing radio waves. The material for the Luneberg dielectric lens must have excellent dielectric characteristics (such as a uniform dielectric constant and a low dielectric loss tangent) to deal with an increasing amount of information, that is, high frequency radio waves. Also, since the antenna is usually installed on the roof of each residence, the material should be small in size and light in weight in view of efficiency and safety of the installation work.

A Luneberg dielectric lens has a spherical or hemispherical shape and comprises a plurality of concentrically stacked layers having different dielectric constants such that the dielectric constant varies, theoretically from 2 to 1, with the innermost center layer having a dielectric constant of about 2 and the outermost layer having a dielectric constant of about 1. Thus, theoretically, a Luneberg dielectric lens is so designed that the dielectric constant $\in_r$ varies from the center (r=0) to the surface (r=R) according to the equation (1) below:

$$\in_r = 2-(r/R)^2 \quad (1)$$

wherein $\in_r$, R and r represent the dielectric constant, the radius of the lens, and the radius at the measuring point, respectively. The dielectric constant of each of the layers is determined with reference to the value determined by the above equation (1).

In reality, however, since a molded product in which the dielectric constant is continuously varied according to an ideal curve given by the equation (1) is difficult to obtain, a Luneberg dielectric lens is produced by combining a plurality of discrete layers having different dielectric constants. One dielectric lens of a Luneberg-type is disclosed in U.S. Patent Published Application No. 20040029985. The dielectric lens is in the form of a sphere having a core and a multiplicity of hollow spherical shells having different dielectric constants, the spherical shells surrounding the core and being concentrically overlapped to each other to form a concentric sphere. The core and the shells are each made of a foam of a synthetic resin containing a dielectric inorganic filler. Since the dielectric lens is light in weight, it can ensure the workability and safety of the installation work. However, the antenna using the dielectric lens disclosed in U.S. Patent Published Application No. 20040029985 is not enough to satisfy performance, such as antenna gain, for practical use.

SUMMARY OF THE INVENTION

It is, therefore, an object of the present invention to provide a Luneberg dielectric lens having excellent antenna characteristics, such as antenna gain, for practical use.

Another object of the present invention is to provide a method capable of producing a series of foam moldings which have varying ceramic contents per unit volume and which are suitably used for the fabrication of a dielectric lens.

In accordance with one aspect of the present invention, there is provided a hemispherical dielectric lens comprising:

a hemispherical center layer having a hemispherical outer surface; and a plurality of hemispherical dome-shaped layers each having concentric inner and outer hemispherical surfaces, the outer surfaces of said center layer and dome-shaped layers having different diameters and the inner surfaces of said dome-shaped layers having different diameters, said center layer and dome-shaped layers being successively concentrically fitted into one another and integrated into a hemispherical shape, said center layer being a foam molding of ceramic-containing thermoplastic resin expanded beads, each of said dome-shaped layers being a foam molding of thermoplastic resin expanded beads containing 0 to 80% by weight of a ceramic, wherein the ceramic content per unit volume of said center and dome-shaped layers decreases from said center layer to the outermost dome-shaped layer, and wherein the standard deviation of the apparent density of each of said center and dome-shaped layers is 0.07 g/cm$^3$ or lower.

In another aspect, the present invention provides a spherical dielectric lens comprising:

a spherical core having a spherical outer surface; and a plurality of hollow spherical shells each having concentric spherical inner and outer surfaces, the outer surfaces of said core and shells having different diameters and the inner surfaces of said shells having different diameters, said core and shells being concentrically disposed and integrated into a spherical shape, said core being a foam molding of ceramic-containing thermoplastic resin expanded beads, each of said shells being a foam molding of thermoplastic resin expanded beads containing 0 to 80% by weight of a ceramic, wherein the ceramic content per unit volume of said core and shells decreases from said core to the outermost shell, and wherein the standard deviation of the apparent density of each of said core and shells is 0.07 g/cm$^3$ or lower.

The present invention also provides a method of producing a series of foam moldings having varying ceramic contents per unit volume for use in fabrication of a dielectric lens, comprising the steps of:

providing ceramic-containing resin particles each having the same percent by weight content of the ceramic;

dividing the resin particles into P-number of groups and foaming and expanding the respective groups of the resin particles in different expansion ratios to obtain P-number of groups of expanded beads having different apparent densities;

selecting Q-number ($1 \leq Q \leq P$) of groups of expanded beads from the P-number of groups of expanded beads and subjecting the Q-number of groups of expanded beads to an apparent density adjusting treatment to obtain R-number ($R \geq 1$) of groups of treated expanded beads, so that there are obtained, in total, (P−Q+R)-number of groups of treated and untreated expanded beads with different apparent densities whose weight has a standard deviation of 0.5 mg or less and whose apparent density has a standard deviation of 0.1 g/cm$^3$ or less; and molding each of the (P−Q+R)-number of groups of expanded beads in different molds having different dimensions of the mold cavity to obtain (P−Q+R)-number of moldings having different weights of the ceramic per unit volume thereof.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS

The hemispherical dielectric lens according to the present invention comprises a hemispherical center (or core) layer and a plurality of hemispherical dome-shaped layers (or shells) concentrically stacked over the center layer. Preferably, the gap between the center layer and the adjacent dome-shaped layer is as small as possible and the gaps between adjacent two dome-shaped layers are also as small as possible. In other words, each adjacent two layers of the dielectric lens are desired to locate in contact with each other. When the gaps are large, a radio wave may be unnecessarily reflected or refracted when passing through the air-layer interfaces to cause a decrease in antenna gain or an increase in sidelobe.

When two similar hemispherical dielectric lenses according to the present invention are combined to form a sphere, a spherical dielectric lens is obtainable. In this case, rather than the use of two hemispherical center layers, a single spherical core may be used as the innermost layer of the spherical dielectric lens. Such a spherical dielectric lens is of course within the scope of the present invention.

Figure 1:
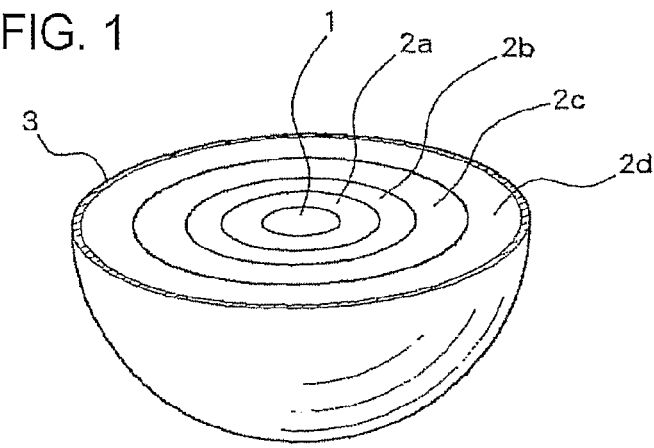
FIG. 1 is a perspective view diagrammatically illustrating an embodiment of a dielectric lens according to the present invention.
Figure 2:
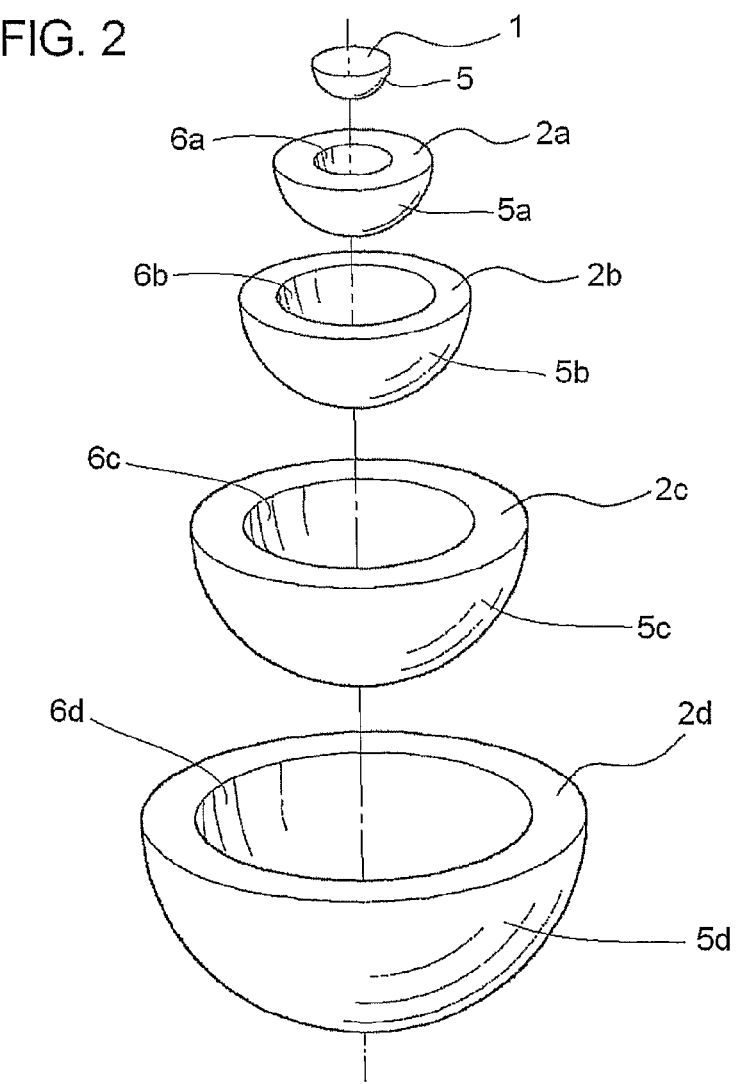
FIG. 2 is a perspective exploded view of the dielectric lens of FIG. 1 with its cover removed.

FIG. 1 depicts an example of the hemispherical dielectric lens according to the present invention. As shown in FIG. 2 which is an exploded view of the dielectric lens of FIG. 1, the dielectric lens has a hemispherical center layer 1 having a hemispherical outer surface 5 and four hemispherical dome-shaped layers 2a, 2b, 2c and 2d having hemispherical outer surfaces 5a, 5b, 5c and 5d and hemispherical inner surfaces 6a, 6b, 6c and 6d. The outer surface of each of the dome-shaped layers 2a, 2b, 2c and 2d is concentric with the inner surface thereof. The diameters of the outer surfaces 5, 5a, 5b, 5c and 5d are different from each other and the diameters of the inner surfaces 6a, 6b, 6c and 6d are different from each other. By successively concentrically fitting the center layer 1 and dome-shaped layers 2a, 2b, 2c and 2d one into another to integrate them, the hemispherical lens shown in FIG. 1 is obtainable. In FIG. 1, designated as 3 is a hemispherical hollow cover having a hemispherical recess into which the hemispherical lens is fitted with its outermost layer 2d being in close contact with the interior surface of the cover 3. The cover may be formed of a synthetic resin. A Luneberg lens antenna is formed by attaching a radio wave reflector (not shown) on the flat surface of the multi-layered dielectric lens. The present invention is, however, not limited to the embodiment shown in FIG. 1.

For reasons of satisfactory antenna performance and easiness in fabrication, the dielectric lens of the present invention preferably has a diameter of about 50 to about 4,000 mm, more preferably about 50 to about 2,000 mm, still more preferably about 120 to about 1,800 mm, most preferably about 350 to 1,000 mm. The number of the dome-shaped layers is at least 2. The upper limit of the number of the dome-shaped layers is approximately 80. For reasons of better approximation of the ideal curve represented by the above equation (1), the number of the dome-shaped layers is preferably at least 4, more preferably at least 7. As an increase of the number of the dome-shaped layers, there is an increased possibility of an increase of air-layer interfaces which will adversely affect the antenna gain. Also, in the lens, the dielectric constant is varied, theoretically from about 2 to about 1, in the direction from the center layer to the outermost layer. Therefore, when the number of layers is large, the difference in dielectric constant between layers has to be extremely small. Thus, the dielectric constant may be reversed between adjacent layers depending on the conditions under which the components of the antenna are produced, so that the antenna performance may be decreased. The number of dome-shaped layers is, therefore, preferably 40 or less, more preferably 20 or less. The thickness of each of the dome-shaped layers is preferably 10 to 80 mm, more preferably 15 to 50 mm, most preferably 15 to 30 mm.

In the present invention, each of the hemispherical center layer and hemispherical dome layers is preferably formed as one piece. For the convenience of fabrication, however, one or more of the layers may be formed by combining a plurality of separately produced pieces.

The center layer is a foam molding of ceramic-containing thermoplastic resin expanded beads, while each of the dome-shaped layers is a foam molding of thermoplastic resin expanded beads and containing 0 to 80% by weight of a ceramic. The foam moldings are produced by an in-mold molding method in which expanded beads of a thermoplastic resin, mixed as needed with the ceramic, are filled into a mold and heated for fuse-bonded together. The expanded beads are produced by foaming and expanding resin particles of a thermoplastic resin mixed, as needed, with the ceramic.

The thermoplastic resin used as a base resin of the foam moldings may be a polyolefin resin such as a low density polyethylene resin, a high density polyethylene resin, a linear low density polyethylene resin, a polypropylene resin, a styrene-modified polypropylene resin obtainable by grafting styrene onto a polypropylene resin; a polystyrene resin, a polyester resin or a polycarbonate resin. If desired, these resins may be used in combination with two or more thereof or in combination with another polymer. Above all, the polyolefin resin or polystyrene resin are preferably used for reasons of advantages in production of expanded beads such as easiness in adjusting the apparent density thereof. Because of excellent heat resistance, mechanical strengths and processability, the polypropylene resin is particularly preferably used as the base resin.

The term "polypropylene resin" as used herein is intended to refer to a propylene homopolymer or a copolymer of propylene with one or more comonomers having a propylene monomer unit content of at least 70 mole %, preferably at least 80 mole %. Examples of the propylene copolymer include propylene-ethylene random copolymers, propylene-ethylene block copolymers, propylene-butene random copolymers and propylene-ethylene-butene random terpolymers.

The foam molding for the center layer contains a ceramic, while each of the foam moldings for the dome-shaped layers contains 0 to 80% by weight of a ceramic. Because a ceramic is contained in the foam molding, the dielectric constant thereof may be easily adjusted. While the dielectric constant of a foam molding may be controlled by controlling the density thereof, it is not easy to prepare a foam molding having a dielectric constant of 1.4 or more by mere control of the density. By incorporation of a ceramic into a foam molding, the dielectric constant thereof can be set at a value higher than 1.4. In the present invention, the dielectric constant of the foam molding is controlled by adjusting not only the density thereof but also the ceramic content (% by weight) thereof.

It is important that the ceramic content per unit volume ($g/cm^3$) of the foam moldings for the center layer and dome-shaped layers decreases from the center layer to the outermost dome-shaped layer, in order for the dielectric constant to vary from about 2 at the innermost center layer to about 1 at the outermost layer on the basis of the above theoretical equation (1). The desired profile of the ceramic content per unit volume ($g/cm^3$) of the foam moldings may be obtained by, for example, incorporating the ceramic in foam moldings in a predetermined amount (% by weight) and reducing the apparent density of the foam moldings from the center layer to the outermost layer. In this case, though the foam moldings have the same ceramic content per unit weight (% by weight), the ceramic content per unit volume thereof ($g/cm^3$) decreases from the center layer to the outermost layer. This follows that a series of the foam moldings having the desired profile of the dielectric constants may be obtained by foaming and expanding the same resin particles (pellets) having a predetermined percent by weight content of the ceramic at various different expansion ratios to obtain various groups of expanded beads having different apparent densities, and by molding the various groups of the expanded beads in different molds. Thus, the dielectric constants of the foam moldings can be controlled easily and the production efficiency thereof can be significantly improved. It is preferred, therefore, that the dielectric lens of the present invention is formed using 1 to 7 kinds, particularly 2 to 5 kinds, of resin particles having different percent by weight contents of the ceramic (the number of the kinds of the resin particles does not exceed (X−1) where X means the number of the layers of the dielectric lens.). Each kind of the resin particles are foamed and expanded at various expansion ratios to obtain various groups of expanded beads having different apparent densities, from which the dielectric lens is obtained by molding in various different molds.

As used in the present specification and appended claims, "that the ceramic content per unit volume ($g/cm^3$) of the foam moldings for the center layer and dome-shaped layers decreases from the center layer to the outermost dome-shaped layer" is intended to mean that the ceramic content per unit volume ($g/cm^3$) of each of the dome-shaped layers is substantially equal to or less than that of its adjacent inner layer (center or dome-shaped layer) and that the ceramic content per unit volume ($g/cm^3$) of the outermost dome-shaped layer is less than that of the innermost center layer. In the case of the dielectric lens shown in FIG. 1, for example, the ceramic contents per unit volume A, B, C, D and E ($g/cm^3$) of the center layer 1 and the dome-shaped layers 2a, 2b, 2c and 2d, respectively, should be such that B is substantially equal to or less than A, C is substantially equal to or less than B, D is substantially equal to or less than C, E is substantially equal to or less than D and E is less than A. Thus, for example, the following conditions are within the scope of the present invention:

$A > B > C > D > E$;

$A > B > C > D \approx E$;

$A > B > C \approx D \approx E$; and $A \approx B > C > D > E$ wherein the symbol $\approx$ indicates "substantially equal to". However, the condition of $A \approx B \approx C \approx D \approx E$ is outside the scope of the present invention. As used herein, the term "substantially equal to" is intended to refer to "equal to" or "not greater by more than 0.009 g/cm³ than". Namely, for example, when D is 0.100 g/cm³ and E is 0.109 g/cm³, E is regarded as being substantially equal to D and, therefore, this condition is included within the scope of the present invention.

It is preferred that the ceramic content per unit volume (g/cm³) of each of the center and dome-shaped layers is equal to or less than that of its adjacent inner layer, when each of the ceramic contents per unit volume (g/cm³) is rounded to the nearest hundredth. It is also preferred that the dielectric lens have at least three layers (inclusive of the center layer) having different ceramic contents per unit volume (g/cm³), when the contents are rounded to the nearest hundredth. It is also preferred the dielectric lens do not have contiguous three or more layers whose ceramic contents per unit volume (g/cm³) are substantially equal to each other. It is particularly preferred that the ceramic content per unit volume (g/cm³) of each of the center and dome-shaped layers is less than that of its adjacent inner layer, when the contents are rounded to the nearest hundredth.

It is also preferred that the apparent density of said center layer and said dome-shaped layers decreases from said center layer to the outermost dome-shaped layer. As used in the present specification and appended claims, "that the apparent density (g/cm³) of the foam moldings for the center layer and dome-shaped layers decreases from the center layer to the outermost dome-shaped layer" is intended to mean that the apparent density (g/cm³) of each of the dome-shaped layers is substantially equal to or less than that of its adjacent inner layer (center or dome-shaped layer) and that the apparent density (g/cm³) of the outermost dome-shaped layer is less than that of the innermost center layer. As used herein, the term "substantially equal to" is intended to refer to "equal to" or "not greater by more than 0.030 g/cm³ than". It is preferred that the apparent density (g/cm³) of each of the center and dome-shaped layers is equal to or less than that of its adjacent inner layer, when each of the apparent density (g/cm³) is rounded to the nearest hundredth. It is particularly preferred that the apparent density (g/cm³) of each of the center and dome-shaped layers is less than that of its adjacent inner layer, when the apparent densities are rounded to the nearest hundredth.

As described above, each of the dome-shaped layers has a ceramic content per unit weight of 0 to 80% by weight. When the ceramic content is greater than 80% by weight, the molding is apt to shrink and to cause deterioration of dimensional accuracy, dielectric characteristics and appearance. For the same reasons, the center layer preferably has a ceramic content per unit weight of not greater than 80% by weight.

The ceramic content per unit weight of each of the center and dome-shaped layers is preferably at least 10% by weight to properly adjust the dielectric constant of the layer to 1.4 or higher. Thus, when the dielectric constant at 1.4 or higher is desired, the ceramic content of the center and dome-shaped layers is preferably 10 to 80% by weight, more preferably 15 to 70% by weight, particularly preferably 20 to 65% by weight. When the intended dielectric constant of a dome layer is less than 1.4, particularly less than 1.2, the ceramic content thereof can be 0.

As used herein, the ceramic content per unit weight Mw (% by weight) of a foam molding is measured as follows. A sample molding having a weight of Wm is combusted in an oven at 600° C. The weight Wr of the combustion residues is then measured. The ceramic content per unit weight (% by weight) of the sample is calculated from:

$$Mw(wt\%) = (Wr/Wm \times 100).$$

The ceramic content per unit weight (% by weight) of the foam molding is equal to the ceramic content per unit weight (% by weight) of the expanded beads from which the foam molding is produced. As used herein, the ceramic content per unit volume Mv (g/cm³) of a foam molding is given as follows:

$$Mv(g/cm^3) = D(g/cm^3) \times Mw(wt\%)/100$$

wherein D is the apparent density of the foam molding and Mw is as defined above.

Any ceramic may be used in the present invention as long as it has a high dielectric constant and can be uniformly dispersed in a thermoplastic resin. A ceramic containing titanium oxide as its major ingredient is preferable because of its high dielectric constant, low specific gravity and excellent dielectric characteristics. The ceramic containing titanium oxide as its major ingredient is preferably titanium oxide or a ceramic having a composition represented by the formula MO.nTiO₂ (wherein M represents one or more divalent metals and n is an integer of 1 or more). Examples of the divalent metal which is represented by M in the above-mentioned formula include, but not limited to, alkaline earth metals such as barium, strontium, calcium and magnesium, and lead.

The alkaline earth metal titanate and lead titanate represented by the above formula MO.nTiO₂ can be produced, for example, by reacting a mixture of titanium oxide with one or more alkaline earth metal or lead compounds, such as a salt, an oxide, a hydroxide, an inorganic acid salt or an organic acid salt of the alkaline earth metal or lead, at a temperature of 500 to 1400° C. Titanium oxide, one of the raw materials, can be produced by a suitable known method described in, for example, Japanese Examined Patent Application (Kokoku Publication) No. H06-88786, Japanese Unexamined Patent Application (Kokai Publication) No. H05-221795 or Japanese Unexamined Patent Application (Kokai Publication) No. H10-95617.

The reaction of titanium oxide with an alkaline earth metal salt or a lead salt is well known in the art and can be carried out by, for example, a hydrothermal method, a calcination method, a wet deposition method or a flux method. Specific examples of alkaline earth metal titanate and lead titanate include barium titanate, calcium titanate, magnesium titanate, strontium titanate, barium strontium titanate, barium calcium titanate, calcium strontium titanate and lead titanate. Above all, calcium titanate is particularly preferably used since it has low dielectric loss at a high frequency band. These titanates may be used singly or in combination with two or more thereof and also used in conjunction with one or more other ceramic materials such as titanium oxide.

The ceramic may be preferably in a fibrous form (for example, in the form of fibers, columns or needles), in a granular form (for example, in the form of spheres, near-spheres, ellipsoidal spheres or near-ellipsoidal spheres) or in a plate-like form (for example, in the form of scales, micaceous or flakes) for reasons of efficiency of kneading with a resin and uniform dispersibility in a resin matrix. A fibrous or plate-like ceramic having a mean value of maximum diameters in the range of 0.1 to 10 µm is particularly preferably used. If desired, fibrous and plate-like ceramics may be used in combination. The size of the ceramic comprising fibrous titanium oxide as its major component is not specifically limited. For reasons of freedom of breakage of cells of the expanded resin beads and good efficiency of adjustment of dielectric constant, the fibrous ceramic generally preferably has a mean value of the maximum diameters thereof (hereinafter referred to as average maximum diameter) of about 0.01 to 30 µm, more preferably about 0.1 to 10 µm, most preferably 0.1 to 1 µm, an average fiber length of about 0.1 to 100 µm, more preferably about 0.5 to 50 µm, most preferably 3 to 50 µm and an aspect ratio (average fiber length/average maximum diameter) of 3 to 30, more preferably 5 to 20.

Also, the size of the ceramic comprising plate-like titanium oxide as its major component is not specifically limited. For the same reasons as above, the plate-like ceramic preferably has a mean value of the maximum length thereof (hereinafter referred to as average maximum length) of about 0.01 to 100 µm, more preferably about 0.01 to 50 µm, most preferably about 0.5 to 20 µm, a mean value of the maximum thickness (hereinafter referred to as average maximum thickness) of 0.01 to 10 µm, more preferably about 0.05 to 5 µm, and an aspect ratio (average maximum length/average maximum thickness) of about 3 to 100, more preferably of about 5 to 50.

The size of the ceramic comprising granular titanium oxide as its major component is not specifically limited. For the same reasons as above, the granular ceramic preferably has a mean value of the maximum length thereof (hereinafter referred to as average maximum length) of about 0.01 to 100 µm, more preferably about 0.01 to 30 µm, most preferably about 0.1 to 1 µm.

As used in the present specification and appended claims, the average maximum diameter, average fiber length, average maximum length and average maximum thickness of the fibrous, plate-like and granular ceramics are measured using an electron photomicroscope. Arbitrarily selected 100 ceramic particles are measured for their maximum diameters, lengths, maximum lengths and/or maximum thicknesses. The average maximum diameter, average fiber length, average maximum length and average maximum thickness are each an arithmetic mean of the 100 samples. It is preferred that the base resin of the foam moldings, from which the dielectric lens of the present invention is formed, contain a polar group-containing polymer, especially a carboxylic acid-modified thermoplastic copolymer containing a carboxylic acid group-containing comonomer, since the uniformity of the apparent density of the expanded beads is improved. The carboxylic acid group-containing comonomer may be, for example, an acid anhydride such as acetic anhydride, succinic anhydride, maleic anhydride or phthalic anhydride, or a carboxylic acid such as methacrylic acid, maleic acid or acrylic acid. When the base resin of the foam moldings contains a polyolefin resin, the carboxylic acid-modified thermoplastic copolymer is preferably a carboxylic acid-modified polyolefin resin. For example, when the base resin of the foam moldings contains a polypropylene resin, the carboxylic acid-modified thermoplastic copolymer is preferably a, particularly preferably a maleic anhydride-modified polypropylene resin. The carboxylic acid-modified polypropylene resin is preferably a graft copolymer having a content of the graft comonomer of preferably 0.5 to 15% by weight, more preferably 1 to 8% by weight, for reasons of improved affinity of the base resin with the ceramic.

The amount of the carboxylic acid-modified thermoplastic copolymer is preferably at least 0.15% by weight, more preferably 0.15 to 1.5% by weight, most preferably 0.2 to 1.0% by weight, based on a total weight of the thermoplastic resin, the carboxylic acid-modified thermoplastic copolymer and the ceramic. Since such a base resin has improved affinity with the ceramic so that the apparent density of expanded beads formed of the base resin have uniform apparent density.

The carboxylic acid-modified thermoplastic copolymer may be incorporated into the base resin by kneading the thermoplastic resin, the ceramic and the carboxylic acid-modified thermoplastic copolymer or by kneading the thermoplastic resin, the ceramic and a master batch containing the carboxylic acid-modified thermoplastic copolymer and the thermoplastic resin. Alternatively, the ceramic is first surface-treated with the carboxylic acid-modified thermoplastic copolymer, the surface-treated ceramic being subsequently kneaded with the thermoplastic resin. The resulting kneaded mixture is pelletized. The pellets (resin particles) are then foamed and expanded to obtain expanded beads which are thereafter fuse-bonded in a mold to obtain a foam molding containing the ceramic dispersed in the foam of the base resin containing the carboxylic acid-modified thermoplastic copolymer.

One or more additives may also be added to the foam molding as long as it does not adversely affect the desired effects of the present invention. The additives may be, for example, an antioxidant, an ultraviolet absorbing agent, antistatic agent, a flame retardant, a metal deactivator, a pigment, a dye, a nucleating agent and a cell size adjusting agent. Illustrative of suitable cell size adjusting agents are zinc borate, talc, calcium carbonate, borax, aluminum hydroxide and other inorganic powders. These additives may be incorporated into the foam molding by kneading the base resin and the ceramic together with the additives. The kneaded mass is pelletized to form resin particles (pellets), from which a foam molding is produced in a manner described above.

It is important that the apparent density of each of the foam moldings constituting the dielectric lens of the present invention has a standard deviation (Sd) of 0.07 g/cm$^3$ or less. When the standard deviation (Sd) is greater than 0.07 g/cm$^3$, the variation of the apparent density is so large that a variation of dielectric characteristics of the molding may be caused, resulting in a failure to obtain a good dielectric lens. Thus, the standard deviation (Sd) of the apparent density is preferably 0.05 g/cm$^3$ or less, more preferably 0.03 g/cm$^3$ or less, most preferably 0.02 g/cm$^3$ or less.

The small standard deviation (Sd) of the apparent density of 0.07 g/cm$^3$ or less may be obtained by using specific expanded beads whose bead has a standard deviation in weight of 0.5 mg or less and whose apparent density has a standard deviation of 0.1 g/cm$^3$ or less for the preparation of the foam molding. Such expanded beads may be obtained by various methods including, for example, a method of producing resin particles having a small variation of weight, a method of expanding and foaming resin particles in a specific manner, a method of classifying expanded beads and a method in which two or more of the above methods are combined.

Resin particles having a small variation of weight may be produced by, for example, adopting various methods during the course of the pelletization process in which kneaded mixture containing the thermoplastic resin and ceramic is extruded in the form of strands and in which the strands are then cooled and cut into particles. One method is to provide a guide for preventing meandering of the stands before cutting. Other methods include adjustments of the rotational speed of the cutter, adjustment of the angle of the cutter relative to the strands, use or an under-water cutting method and/or classifying the resin particles using a suitable sieve such as a rotary tubular sieve.

The method of expanding and foaming resin particles in a specific manner may be, for example, adopting a dispersion method (which will be described in detail hereinafter) in which a dispersion of softened resin particles in a dispersion medium is discharged from a closed vessel while applying a pressure to the closed vessel so as to maintain the pressure within the closed vessel constant; adopting a dispersion method in which the dispersion is discharged from the closed vessel to a pressurized atmosphere; adopting a dispersion method in which the dispersion is discharged from the closed vessel while gradually reducing the rotational speed of a stirrer with which the dispersion within the closed vessel is stirred; and adopting two or more of the above method in combination.

The method of classifying expanded beads may be, for example, sieving the expanded beads into desired particle sized or classifying the expanded beads by a gravity separator or by an air classifier. Two of more classified or unclassified expanded beads may be blended to obtain expanded beads having a desired apparent density.

In order to attain the small standard deviation (Sd) of the apparent density of 0.07 g/cm$^3$ or less, it is also effective to mold the expanded beads in such a manner that the expanded beads are prevented from being subjected to high compressive forces within the mold cavity. To this end, it is advantageous not to impart a high secondary expansion power to the expanded beads. It is also preferable to reduce the pressure applied to the expanded beads at the time of filling the expanded beads in the mold cavity. When the expanded beads are molded while being subjected to high compressive forces, a surface region of the foam molding has a greater apparent density than that of an inner region, resulting in a variation of the dielectric constant of the foam molding.

Figure 5A:
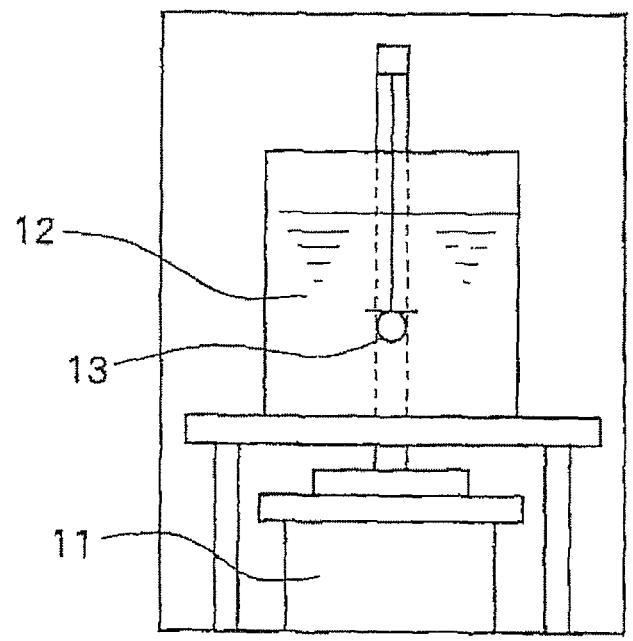
FIG. 5(a) is an elevational view schematically illustrating a device for measuring the specific gravity of an expanded bead.
Figure 5B:
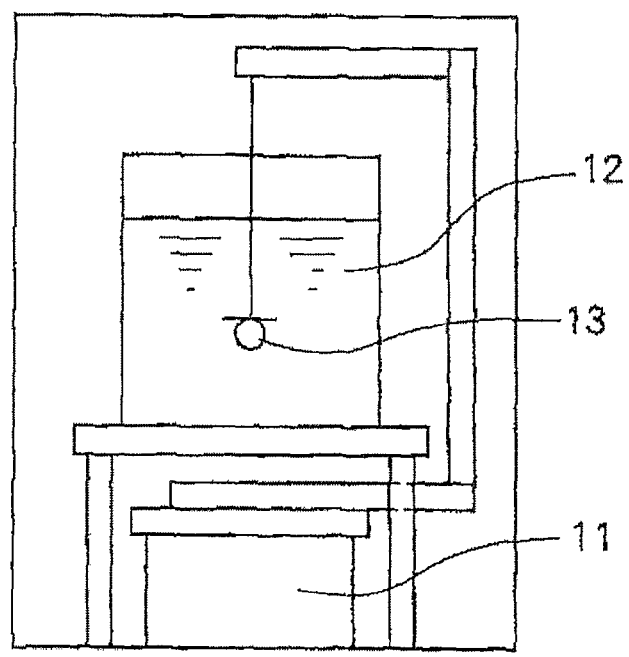
FIG. 5(b) is a side view of FIG. 5(a)

The standard deviation of the apparent density of the expanded beads is determined by measuring the apparent density of each of arbitrarily selected 1000 expanded beads. From the results of the measurement, the standard deviation is calculated. The apparent density is measured as follows:

1. Arbitrarily selected 1000 expanded beads are allowed to stand in the atmosphere at 23° C. under a relative humidity of 50% for 48 hours. The weight (W1) of each of the 1000 expanded beads is then measured up to the second decimal place.
2. Using a densimeter, the specific gravity (ρ1) of ethanol (purity: 99% or higher) is measured up to the third decimal place.
3. A density measuring system as shown in FIGS. 5(*a*) and 5(*b*) is provided. The system includes a microbalance 11, and a vessel containing the above ethanol 12.
4. Each of the expanded beads (designated as 13) is immersed in the ethanol to measure the weight (W2) of the immersed bead up to the second decimal place. The weight W2 is a difference between gravity and buoyancy acted on the expanded bead.
5. The specific gravity (ρ0) of the expanded bead is calculated using the following formula:

$$\rho 0 = W1 / \{(W1-W2)/\rho 1\}$$

6. The apparent density (g/cm$^3$) of the expanded bead is calculated using the following formula:

$$\text{Apparent density} = \rho \times \rho 0$$

wherein ρ is the density of pure water (namely 1 g/cm$^3$).

The standard deviation of the weight of the expanded beads is determined by measuring the weight (mg) of each of arbitrarily selected 1000 expanded beads, which have been allowed to stand in the atmosphere at 23° C. under a relative humidity of 50% for 48 hours, up to the third decimal place.

Figure 6A:
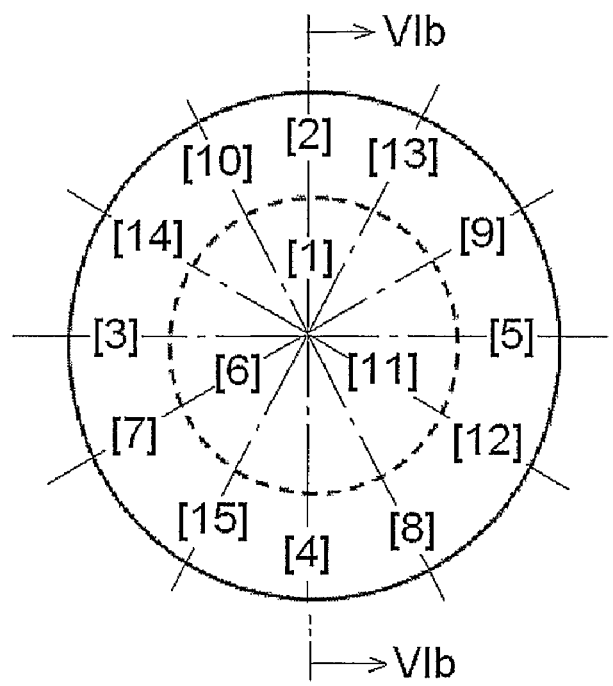
FIG. 6(a) is a plan view of a dome-shaped layer showing the sampling positions at which samples are cut out from the dome-shaped layer for the measurement of their dielectric constants.
Figure 6B:
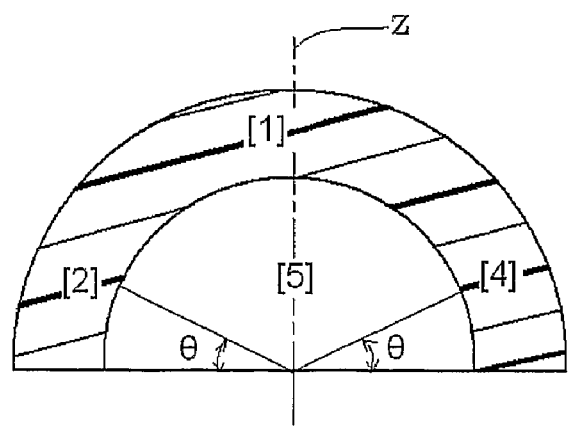
FIG. 6(b) is a sectional view taken on the line VIb-VIb in FIG. 6(a)

The standard deviation (Sd) of the apparent density of a foam molding is measured as follows. From the foam molding, fifteen (15) rectangular parallelepiped specimens each having a length of 16 mm, a width of 10 mm and a thickness of 8 mm are cut out at the position [1] to [15] shown in FIG. 6(*a*). Each of the three positions [1], [6] and [11], which are angularly equally spaced through the angle of about 120 degrees, is near the top of the foam molding and is not spaced more than 5 cm from the top of the foam molding. The position [2] to [5] are angularly equally spaced apart from each other and each spaced an angle of about 20 degrees (shown as θ in FIG. 6(*b*)) from the plane including the annular edge of the foam molding. The position [7] to [10] and the position [12] to [15] are also arranged similarly to the positions [2] to [5]. The axis in the thickness direction of each of the cut samples is in parallel or nearly in parallel with the radial direction of the hemispherical foam molding. When the thickness of the foam molding is too small to cut out samples having a thickness of 8 mm, cutting is carried out so that the thickness of the sample is as large as possible. Each of the fifteen specimens is measured for the apparent density. From the results of the measurement, the standard deviation (Sd) of the apparent density is calculated. The apparent density is determined by measuring the weight of the sample up to the second decimal place and by measuring the dimensions of the sample with an electric caliper up to the second decimal place. From the measured dimensions, the volume of the sample is calculated. The apparent density is given by dividing the weight of the sample by the volume thereof.

As used in the present specification and appended claims, the term "standard deviation" is defined as the square root of the variance.

It is preferred that a region adjacent to the outer surface of the center layer or adjacent to the outer and inner surfaces of each of the dome-shaped layers except the outermost dome-shaped layer have a ratio (V/N) of the number of voids V to the number of expanded beads N in the range of 0.2 to 1.0, more preferably 0.3 to 1.0, most preferably 0.4 to 1.0, for reasons of preventing an increase of the apparent density of the surface region of the foam molding while ensuring satisfactory fuse-bonding between the expanded beads. The voids are gaps formed between adjacent expanded beads. The number of voids V and the number of expanded beads N at a region adjacent to the outer surface of the center layer or adjacent to the outer and inner surfaces of each of the dome-shaped layers except the outermost dome-shaped layer are measured as follows. A surface region with a thickness of about 500 µm is cut from a foam molding from hemispherical surface of the center layer or from an outside and inside peripheral surfaces of a dome-shaped layer. The number of voids V and the number of expanded beads N which are present in a square area (5 cm×5 cm) on the exposed cut surface are counted. The voids and expanded beads which are present on the boundaries of the square area are included in the numbers V and N, respectively. It is preferred that voids having an area of 0.3 to 2.5 mm$^2$ account for at least 75% of the number of voids V.

The fact that the foam molding has a ratio V/N of 0.2 to 1.0 means that the surface thereof is not required to be smooth. Rather, the surface of the foam molding is desired to have voids between adjacent expanded beads. In general, a foam molding is desired to have a smooth surface for reasons of appearance. The molding operation is thus generally performed in such a manner that the expanded beads are pressed against the smooth interior surface of the mold so that the smoothness is printed on the foam molding. In this case, however, the surface region of the foam molding has a higher density as compared with the inside region thereof, resulting in variation of the dielectric constant in the foam molding. In the present invention, the molding is preferably carried out so that the expanded beads are prevented from contacting the interior surface of the mold with a high contact pressure, while ensuring fuse-bonding between the expanded beads. In particular, steam is preferably fed to the mold while maintaining the pressure thereof below the secondary expansion power of the expanded beads. The secondary expansion power of the expanded beads may be measured in situ by mounting a surface pressure measuring device on an interior wall of the mold.

The V/N ratio of the outermost dome-shaped layer has little influence upon the variation of the dielectric constant thereof and can be in the range of 0 to 1.0.

It is preferred that the dielectric lens of the present invention have an overall apparent density of 0.03 to 1.2 g/cm$^3$, more preferably 0.05 to 1.0 g/cm$^3$, most preferably 0.1 to 0.8 g/cm$^3$ for reasons of satisfactory dielectric performance, easiness in obtaining desired dielectric constant profile, and feasibility of light weight and satisfactory mechanical strengths. The overall apparent density of the dielectric lens is measured in accordance with JIS K7222-1999. The volume of the dielectric lens is calculated from measurement of the outer dimension thereof.

The hemispherical center layer and hemispherical dome-shaped layers constituting the dielectric lens of the present invention are foam moldings of the ceramic-containing expanded beads formed of a thermoplastic resin as the base resin. The thermoplastic resin, which is described previously, is preferably a non-crosslinked resin such as a non-crosslinked polypropylene resin or non-crosslinked linear low density polyethylene resin. The thermoplastic resin may be, however, a cross-linked resin. For example, a crosslinked low density polyethylene resin may be suitably used for the purpose of the present invention.

When a polypropylene resin is used as the base resin of the expanded beads, it is preferred that the foam molding obtained therefrom shows a high temperature endothermic peak, in a DSC curve thereof, in addition to an intrinsic endothermic peak located at a lower temperature side of the high temperature peak and that the calorific value ($\Delta H_h$ J/g) of the high temperature peak be 2 to 35% of the calorific value ($\Delta H_t$ J/g) of the whole endothermic peaks, for reasons of good dimensional stability, small variation of the apparent density. The percentage calorific value ($\Delta H_h/\Delta H_t \times 100$) of the high temperature peak based on the whole endothermic peaks is more preferably 5 to 35%, most preferably 10 to 30%. The calorific value of the whole endothermic peaks ($\Delta H_h$) is a sum of the calorific values of the high temperature peak(s) and intrinsic peak(s).

The calorific value of the high temperature peak of the foam molding may be adjusted by controlling the calorific value of the expanded beads from which the foam molding is produced. The expanded polypropylene resin beads providing a DSC curve having a high temperature peak may be produced by, for example, heating a dispersion containing polypropylene resin particles (pellets) to a temperature higher than the melting point (Tm) of the polypropylene resin but not exceeding the melt completion temperature (Te) thereof for a time sufficient to increase the calorific value of the high temperature peak. The calorific value of the high temperature peak of the expanded beads may be reduced when the expansion is carried out at a high temperature within the suitable range of the expansion temperature. The calorific value of the high temperature peak and the calorific value of the whole endothermic peaks of expanded beads are nearly equal to those of the foam molding obtained from the expanded beads.

Figure 3:
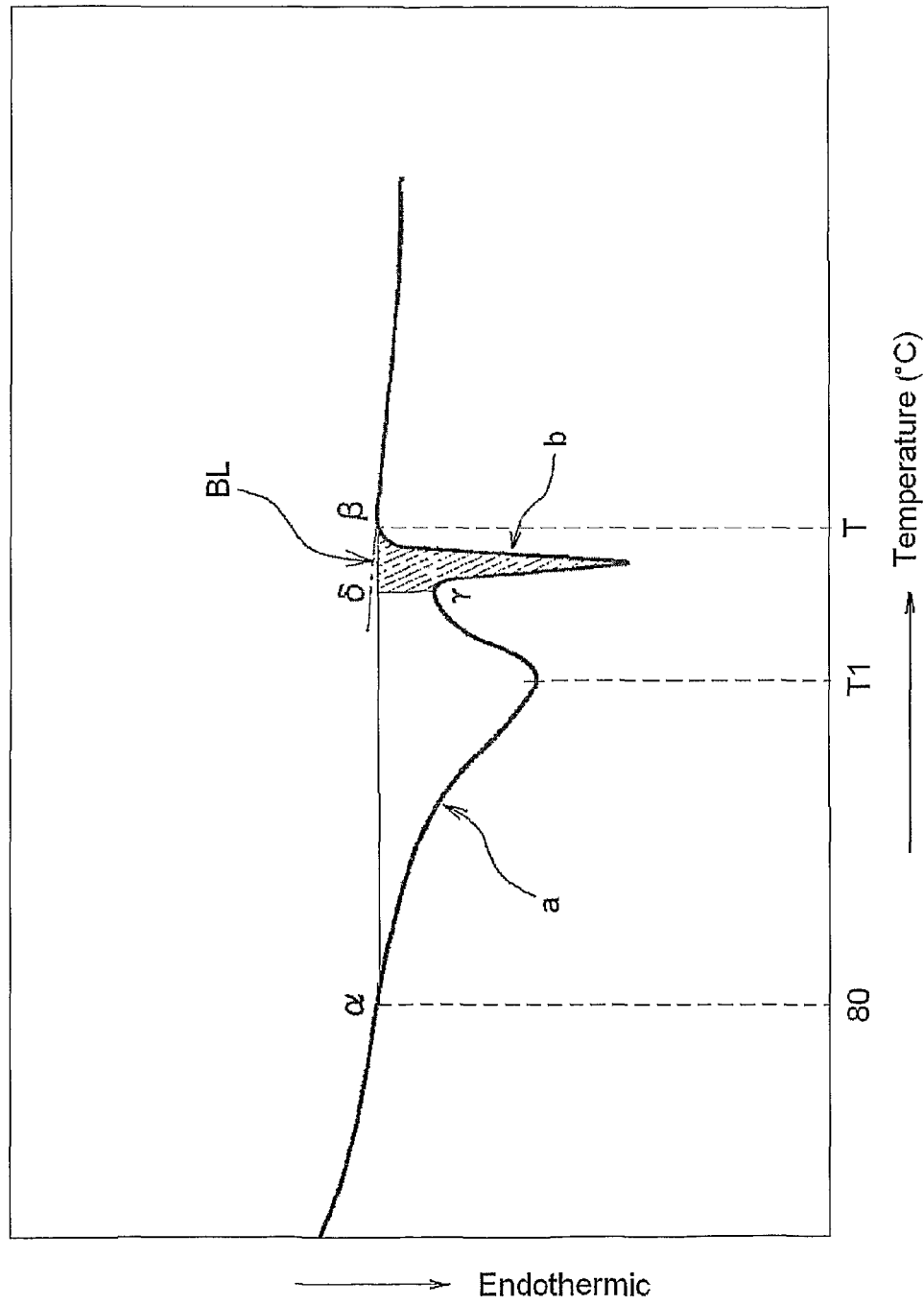
FIG. 3 shows an example of a chart of an initial DSC curve of a molding of polypropylene resin expanded beads.

The calorific value of the high temperature peak of the expanded beads and the foam molding is the amount of endotherm and corresponds to the area of an endothermic peak (a high temperature peak) "b" which is present on a higher temperature side of an endothermic peak (intrinsic peak) "a" in a first DSC curve which is shown in FIG. 3. These peaks are obtained by the differential scanning calorimetric analysis wherein 2 to 4 mg of a sample obtained from the expanded beads or the foam molding are heated from room temperature (15 to 40° C.) to 220° C. at a heating rate of 10° C./minute. More specifically, the calorific value may be determined as follows. In the DSC curve as shown in FIG. 3, a straight line (α-β) extending between the point α in the curve at 80° C. and the point β in the curve at a melt completion temperature T of the expanded beads is drawn. The melt completion temperature T is a temperature of an intersection β at which the high temperature peak "b" meets the base line BL. Next, a line which is parallel with the ordinate and which passes a point γ in the curve at the bottom of the valley between the intrinsic peak "a" and the high temperature peak "b" is drawn. This line crosses the line (α-β) at a point δ. The area of the high temperature peak "b" is the area (shaded portion in FIG. 3) defined by the curve of the high temperature peak "b", the line (δ-β), and the line (γ-δ) and corresponds to the calorific value (amount of endotherm) of the high temperature peak "b". The total of the calorific values of the high temperature peak and the intrinsic peak corresponds to the total area defined by the line (α-β) and the DSC curve.

The high temperature peak "b" of the foam molding generally appears at a temperature ranging from (T1+5° C.) to (T1+30° C.), more generally ranging from (T1+8° C.) to (T1+25° C.) where T1 is the temperature of the intrinsic peak "a".

Figure 4:
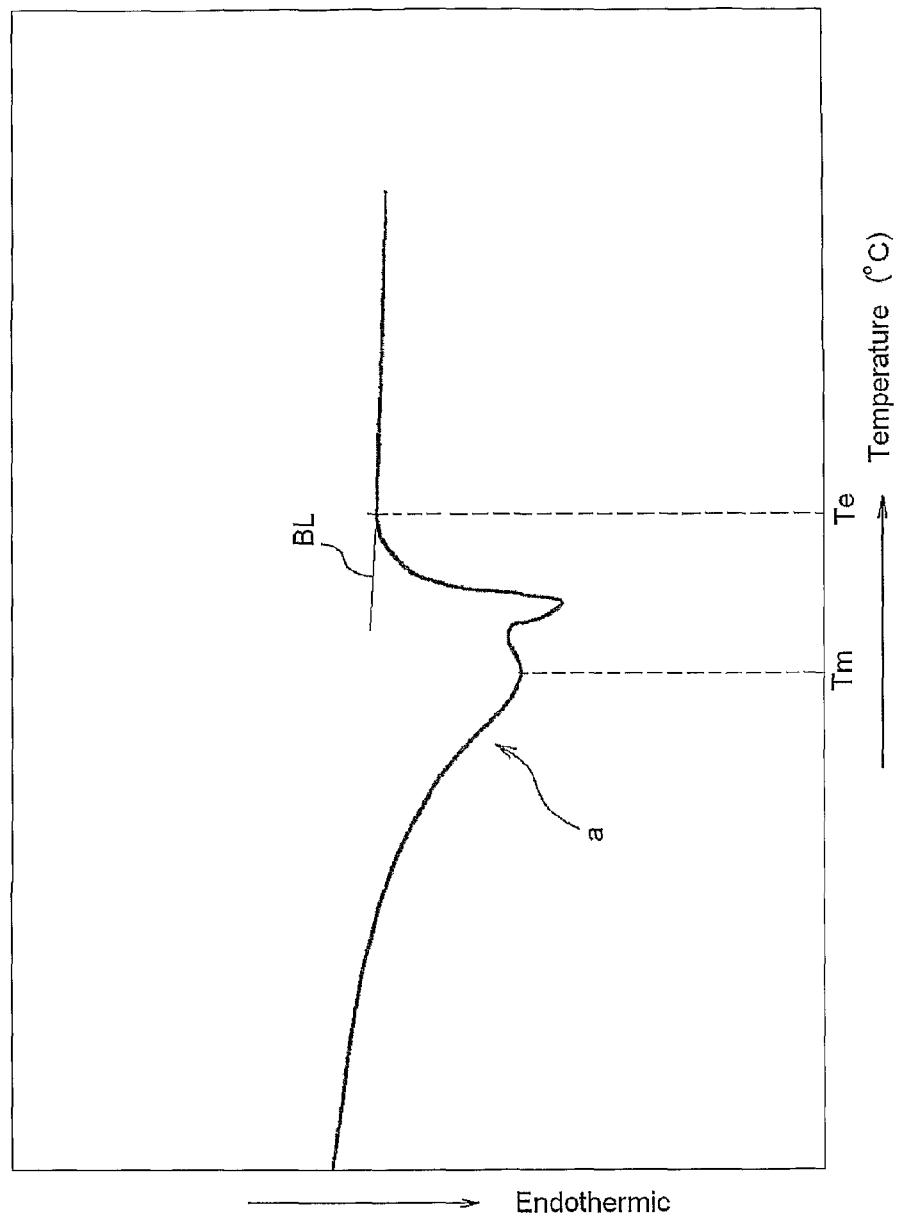
FIG. 4 shows an example of a chart of a second time DSC curve of polypropylene resin used to measure the melting point and melt completion temperature thereof.

As used herein, the term "melting point of the polypropylene resin" is intended to refer to that measured by DSC analysis wherein a sample resin is heated from room temperature (10 to 40° C.) to 220° C. at a rate of 10° C./min. The sample is then immediately cooled to about 40° C. (40 to 50° C.) at a rate of 10° C./min and is measured again for a DSC curve by heating to 220° C. at a rate of 10° C./min to obtain a second DSC curve as shown in FIG. 4. The temperature Tm of the endothermic peak in the second DSC curve as shown in FIG. 4 represents the melting point. When a plurality of endothermic peaks are observed in the second DSC curve, the melting point Tm is the peak temperature of that peak which has the greatest peak area among those peaks. However, when there are a plurality of peaks and when the next largest peak has an area not smaller than 60% of the largest peak, then the melting point is the arithmetic mean of the temperatures of the largest and the next largest peaks. The melt completion temperature of the polypropylene resin is a temperature Te of an intersection β at which the high temperature peak meets the base line BL in the second DSC curve.

It is preferred that each of the foam moldings constituting the dielectric lens of the present invention have an average cell number of 20 to 1,000 per mm$^2$ of a cross-section thereof and an average cell diameter of 5 to 200 μm for reasons of dimensional stability and uniform dielectric constant. The average cell number and average cell diameter of a foam molding are nearly equal to those of the expanded beads from which the foam molding is produced. Thus, the average cell number and average cell diameter of a foam molding are controlled by controlling the average cell number and average cell diameter of the expanded beads. The expanded beads having the above-specified average cell number and average cell diameter show suitable secondary expansion property and good fuse-bonding property.

The average cell number and average cell diameter of the expanded beads may be controlled by controlling the amount of the ceramic and the conditions, such as pressure and temperature, under which the expansion and foaming of resin particles (pellets) are performed. More particularly, when the expanded beads are produced by a dispersion method in which a dispersion of resin particles in a dispersing medium contained in a closed vessel and maintained at an elevated temperature and a high pressure is discharged from an outlet of the closed vessel to a lower pressure atmosphere, attachment of an orifice to the outlet so as to provide a large pressure gradient can reduce the average cell diameter and increase the average cell number. When the outlet is heated at an elevated temperature to perform the expansion at a high temperature, the average cell diameter increases and the average cell number decreases.

As used herein, the average cell number and average cell diameter of the foam molding is measured as follows. A sample foam molding is arbitrarily cut and an arbitrarily selected square area (10 mm×10 mm) in the cross-section is observed to count the number of cells. The average cell number is obtained by dividing the count by the area (100 $mm^2$). In counting the number of cells, those cells present on the top and right sides of the square are omitted from the count, while those cells present on the lower and left sides of the square are included in the count. The square on the cross-section is also measured for the diameter (the maximum of the distances between two points in the cell on the cross-section) of each of the cells. The average cell diameter is the arithmetic mean of the diameters of the cells. The expanded beads for use in the production of the foam moldings are preferably spherical, near-spherical, ellipsoidal, columnar or near-columnar in shape, since such beads can be uniformly filled in a mold cavity, which in turn results in a uniform apparent density of the foam molding obtained.

The average maximum length of the expanded beads is generally 0.5 to 10 mm, preferably 0.8 to 5.0 mm, more preferably 1.0 to 3.0 mm, for reasons of minimizing variation of the apparent density of the foam molding. The average maximum length of the expanded beads is the arithmetic mean of the maximum lengths of arbitrarily selected 50 expanded beads measured using a caliper. The maximum length of a spherical expanded bead is the diameter thereof. In the case of an expanded bead in a columnar shape, the maximum length is determined as follows. The axial direction of the columnar expanded bead is chosen to be the Z-axis. The maximum of the dimensions of the expanded bead in the direction of the Z-axis is determined. Also, the maximum of the dimensions of the expanded bead in the direction of the X-axis and the maximum of the dimensions of the expanded bead in the direction of the Y-axis are determined. The maximum length is the greatest of the three maximum dimensions in the X-, Y- and Z-axes.

When the expanded beads are spherical, the average maximum length thereof is preferably 0.8 to 5.0 mm, more preferably 1.0 to 3.0 mm. When the expanded beads are columnar, the average (L) of the maximum length in the Z-axis and the average (D) of the maximum diameter in the X- or Y-axis thereof are each in the range of 0.8 to 5.0 mm, preferably 1.0 to 3.0 mm. In this case, the aspect ratio L/D is preferably 0.8 to 1.2.

The average of the maximum length (L) and the average of the maximum diameter (D) of the columnar expanded beads may be controlled during the pelletization step in which a kneaded mass of the base resin and optionally ceramic is extruded in the form of strands and in which the strands are cut to obtain resin particles (pellets). By controlling the diameter and cut length of the strands, namely by controlling the shape of the pellets, the length L and aspect ratio L/D of the expanded beads may be controlled. Spherical expanded beads may be prepared using spherical resin particles. Spherical resin particles may be prepared by, for example, cutting strands in warm water. It is preferred that the foam moldings constituting the dielectric lens of the present invention have an open cell content (in accordance with ASTM D2856-70, Procedure C) of 40% or less, more preferably 30% or less, most preferably 20% or less, for reasons of high mechanical strength and low variation of apparent density.

A method for producing the dielectric lens of the present invention will be next described. The dielectric lens comprises a hemispherical center layer and a plurality of hemispherical dome-shaped layers. Each of the center and dome-shaped layers is a foam molding obtained by heating expanded beads filled in a mold with steam. The expanded beads may be prepared by foaming and expanding resin particles. Production of resin particles, expanded beads and foam moldings will be described in more detail below.

Resin particles may be prepared by feeding a base resin such as a polypropylene resin, a ceramic and, if desired, one or more additives such as a polar group-containing thermoplastic resin (e.g. maleic anhydride-modified polypropylene) to an extruder. The ceramic is not fed to the extruder, when the foam molding to be produced is ceramic free. The feed is then heated, melted and kneaded in the extruder and, thereafter, is extruded through a die in the form of strands. The strands are cooled and cut to obtain resin particles (pellets).

The resin particles are then foamed and expanded by any suitable method, preferably by a dispersion method in which the resin particles are dispersed in a suitable dispersing medium such as an aqueous medium in a closed vessel. The dispersion in the vessel is heated in the presence of a blowing agent to impregnate the resin particles with the blowing agent. The dispersion is then discharged from the vessel to a lower pressure zone at a temperature sufficient for the resin particles to foam and expand.

To prevent fuse-bonding of the resin particles, a dispersing agent which may be an organic or inorganic powder is preferably added to the dispersing medium. Particularly suitable is the use of fine particles of an inorganic material such as natural or synthetic clay mineral (kaolin, mica or clay), aluminum oxide, titanium oxide, basic magnesium carbonate, basic zinc carbonate, calcium carbonate or iron oxide. These inorganic materials may be used singly or in combination of two or more thereof in an amount of 0.001 to 5 parts by weight per 100 parts by weight of the resin particles.

The amount of the blowing agent is suitably selected in consideration of the kind of the blowing agent, expansion temperature and apparent density of the expanded beads to be produced. When nitrogen gas is used as the blowing agent and water is used as the dispersing medium, the nitrogen gas is used in an amount so that the pressure in the closed vessel immediately before the start of the discharge of the dispersion, namely the pressure in the upper space of the closed vessel, is in the range of 0.6 to 6 MPaG. The pressure in the upper space of the vessel is preferably made higher as the apparent density of the expanded beads to be produced is low. The pressure in the upper space of the vessel is preferably made lower as the apparent density of the expanded beads to be produced is high.

The blowing agent used in the dispersion method may be an organic physical blowing agent or an inorganic physical blowing agent. Examples of the organic physical blowing agents include aliphatic hydrocarbons such as propane, butane, pentane, hexane and heptane, and alicyclic hydrocarbons such as cyclobutane and cyclohexane. Examples of inorganic physical blowing agents include air, nitrogen, carbon dioxide, oxygen, argon and water. These organic and inorganic blowing agents may be used singly or as a mixture of two or more. Particularly suitably used is a blowing agent containing, as its essential ingredient, one or more an inorganic physical blowing agent selected from nitrogen, oxygen, air, carbon dioxide and water. For reasons of stability (uniformity) of apparent density of expanded beads, low costs and freedom of environmental problem, the use of air, carbon dioxide or water is preferred. Water such as ion-exchanged water used as the dispersing medium for dispersing the resin particles therein may be used as the blowing agent as such.

It is preferred that the expanded beads obtained by the dispersion method show a high temperature endothermic peak, in a DSC curve thereof, in addition to an intrinsic endothermic peak located at a lower temperature side of the high temperature peak and that the calorific value ($\Delta H_h$ J/g) of the high temperature peak be 2 to 35% of the calorific value ($\Delta H_t$ J/g) of the whole endothermic peaks, for reasons of good dimensional stability and small variation of the apparent density of the foam molding obtained from the expanded beads. Such expanded beads may be obtained by selecting the suitable expansion temperature, since the calorific value of the high temperature peak can be changed by changing the expansion temperature. The expanded beads thus obtained are then molded to obtain a foam molding. The foam molding may be suitably obtained by a batch-type molding method in which the expanded beads (if necessary, after being treated to increase the pressure inside of the cells thereof up to about 0.3 MPaG) are filled in a mold cavity. After closing the mold, saturated steam is fed to the mold to heat, expand and fuse-bond the beads together. The mold is then cooled and opened to take the foam molding out of the mold.

If desired, before the molding is carried out, the expanded beads may be treated with a pressurized gas to increase the inside pressure thereof to 0.1 to 0.6 MPaG. The treated beads are then heated with steam or hot air so that the apparent density of the expanded beads is further reduced. When the increase of the inside pressure of the expanded beads is desired, the expanded beads are allowed to stand in a closed vessel to which a pressurized gas has been fed for a suitable period of time so that the pressurized gas penetrates into the cells. Any gas may be used for the pressure increasing treatment as long as it is in the form of gas under conditions where the expanded beads are treated. The gas may be suitably a gas containing an inorganic gas as a major component. Examples of the inorganic gas include nitrogen, oxygen, air, carbon dioxide and argon. Nitrogen or air is suitably used for reasons of costs and freedom of environmental problems.

Each of the foam moldings constituting the dielectric lens of the present invention has an apparent density whose standard deviation (Sd) is 0.07 g/cm³ or less. To obtain such foam moldings, it is preferable to use expanded beads whose weight has a standard deviation of 0.5 mg or less, more preferably 0.2 mg or less, and whose apparent density has a standard deviation of 0.1 g/cm³ or less, more preferably 0.03 g/cm³ or less (provided that each of the expanded beads used for the formation of each layer has the same percent by weight content of the ceramic). By using plural groups of expanded beads with each group having the above standard deviations of the weight and apparent density, a series of foam moldings each having a uniform apparent density can be obtained. Yet, a difference in apparent density and in ceramic content per unit volume between foam moldings can be made small as desired.

A series of foam moldings having different weights of a ceramic per unit volume thereof can be suitably prepared by the following method. First, ceramic-containing resin particles each having the same percent by weight content of the ceramic are provided. The resin particles are divided into P-number of groups and the respective groups of the resin particles are foamed and expanded in different expansion ratios to obtain P-number of groups of expanded beads having different apparent densities. Then, Q-number of (1≦Q≦P) of groups are selected from the P-number of groups of expanded beads and are subjecting to an apparent density adjusting treatment to obtain R-number (R≧1) of groups of treated expanded beads, so that there are obtained, in total, (P−Q+R)-number of groups of treated and untreated expanded beads with different apparent densities whose weight has a standard deviation of 0.5 mg or less and whose apparent density has a standard deviation of 0.1 g/cm³ or less. The (P−Q+R)-number of groups of the expanded beads are then molded in different molds having different dimensions of the mold cavity to obtain (P−Q+R)-number of moldings having different weights of the ceramic per unit volume thereof.

When the above method is carried out using two or more groups of ceramic-containing resin particles (each resin particle of the same group has the same percent by weight content of the ceramic but resin particles of different groups have different percent by weight contents of the ceramic), a large number of layers may be produced. Thus, the above method allows the preparation of a dielectric lens having at least 5 layers, preferably 5 to 41 layers, more preferably 8 to 21 layers, in which the dielectric constant decreases from 2 to 1, the highest dielectric constant being the innermost hemispherical center layer, and which can approximate the pure Luneberg lens.

The following examples will further illustrate the present invention. Parts and percentages are by weight. While the following examples particularly describe dielectric lenses in the form of moldings of polypropylene resin expanded beads, the objects of the present invention can be achieved using moldings of expanded beads made of other base resins, such as those described previously, than the polypropylene resin. Thus, the following examples are to be considered in all respects as illustrative and not restrictive.

EXAMPLE 1

A dielectric lens having a diameter of 800 mm and composed of 13 layers was produced as shown in Table 3. In Table 3, "number of layers" indicates a total number of layers inclusive of a center layer and dome-shaped layers.

The dielectric constant $\in_r$ of each layer of the dielectric lens should be adjusted on the basis of the above-described theoretical formula (1). Thus, the content of a ceramic material and the apparent density of a molding of the expanded beads of each layer were adjusted. For the purpose of adjusting the apparent density with high accuracy, two kinds of resin particles (Resin Particles 1-1 and 1-2) were prepared and were foamed and expanded by the dispersion method under various conditions to obtain seven kinds of expanded beads (Expanded Beads 1-1 to 1-7). The expanded beads were classified to obtain 13 kinds of expanded beads having varying apparent densities for the fabrication of the 13 layers of the dielectric lens. Details of the preparation of the resin particles, preparation of expanded beads and preparation of moldings of the expanded beads are as follows.

Preparation of Resin Particles:

Resins (Resin 1 and Resin 2) shown in Table 1 and ceramic (Cer 1) shown in Table 2 were blended in the proportion shown in Table 4. Each blend was kneaded in a two-axis extruder, extruded and pelletized to obtain Resin Particles 1-1 and 1-2 in the form of columnar particles. The maleic anhydride contents of Resin Particles 1-1 and 1-2 are shown in Table 4.

TABLE 1

| Resin | Kind | Trade name | Maleic anhydride content (wt %) |
|---|---|---|---|
| Resin 1 | propylene-ethylene copolymer | EG4A of Japan Polypro Corporation | — |
| Resin 2 | maleic anhydride-modified propylene-ethylene copolymer | H3000P of Toyo Kasei Kogyo Co., Ltd. | 6.2 |
| Resin 3 | maleic anhydride-modified propylene-ethylene copolymer | H3000P of Toyo Kasei Kogyo Co., Ltd. (Resins 2 and 3 differ in lot number) | 5.1 |

TABLE 2

| Ceramic | Kind | Shape | Dimension |
|---|---|---|---|
| Cer 1 | calcium titanate | fibers | average max diameter: 0.3 μm, average length: 3 μm |
| Cer 2 | titanium oxide | spheres | average diameter: 0.21 μm |

TABLE 3

| Example | Diameter (mm) | Number of Layers |
|---|---|---|
| Example 1 | 800 | 13 |
| Example 2 | 370 | 8 |
| Example 3 | 450 | 8 |
| Example 4 | 800 | 13 |
| Example 5 | 370 | 8 |
| Example 6 | 800 | 13 |
| Example 7 | 370 | 8 |
| Comparative Example 1 | 370 | 8 |
| Comparative Example 2 | 800 | 13 |

TABLE 4

| Resin Particles | Ceramics | | Polypropylene resin Amount (wt %) | Maleic anhydride content (wt %) |
|---|---|---|---|---|
| | Kind | Amount (wt %) | | |
| 1-1 | Cer 1 | 50 | Resin 1/Resin 2 = 45/5 | 0.31 |
| 1-2 | Cer 1 | 30 | Resin 1/Resin 2 = 65/5 | 0.31 |

Preparation of Expanded Beads:

Resin Particles 1-1 and 1-2 were each charged in an autoclave in an amount of 100 parts and dispersed in 300 parts of water together with 1.0 part of aluminum oxide (adhesion preventing agent) and 0.01 part of sodium dodecylbenzenesulfonate to obtain a dispersion.

After closing the autoclave, the dispersion was heated with stirring to a temperature lower by 5° C. than the expansion temperature shown in Table 5-1. While maintaining the dispersion at that temperature, the blowing agent shown in Table 5-1 was introduced into the autoclave. The dispersion was then maintained at that temperature for 15 minutes. Thereafter, the temperature was raised to the expansion temperature shown in Table 5-1 and the dispersion was maintained at that temperature for another 15 minutes. The inside pressure of the autoclave at this step is shown in Table 5-1 as expansion pressure. Thereafter, while maintaining the contents in the autoclave at the expansion temperature, one end of the autoclave was opened to discharge the dispersion to the atmosphere to obtain expanded beads (Expanded Beads 1-1 to 1-7). The discharge was carried out while feeding the same blowing agent such that the pressure within the autoclave was maintained at the expansion pressure.

The expanded beads thus obtained by the dispersion method were measured for the calorific value ($\Delta H_h$) of the high temperature peak, calorific value ($\Delta H_t$) of the whole endothermic peaks, percentage calorific value ($\Delta H_h/\Delta H_t \times 100$) of the high temperature peak based on the whole endothermic peaks, average cell number per mm² of the cross-section, average cell diameter in the cross-section, shape, average maximum diameter (D) and average maximum height (L). The results are summarized in Table 5-2.

TABLE 5-1

| | | Expansion Conditions | | |
|---|---|---|---|---|
| Expanded Beads | Resin Particles | Blowing agent | Expansion temperature (° C.) | Expansion pressure (MPaG) |
| 1-1 | 1-1 | air | 149.0 | 2.2 |
| 1-2 | 1-1 | air | 149.0 | 2.7 |
| 1-3 | 1-1 | air | 149.0 | 2.9 |
| 1-4 | 1-1 | $CO_2$ | 145.5 | 2.2 |
| 1-5 | 1-1 | $CO_2$ | 145.5 | 2.4 |
| 1-6 | 1-2 | air | 149.5 | 2.8 |
| 1-7 | 1-2 | air | 149.5 | 3.4 |

TABLE 5-2

| Expanded Beads | $\Delta H_h$ (J/g) | $\Delta H_t$ (J/g) | $\Delta H_h/\Delta H_t \times 100$ (%) | Average cell number per mm² | Average cell Diameter (μm) | Shape | Average maximum diameter D (mm) | Average maximum length L (mm) | L/D |
|---|---|---|---|---|---|---|---|---|---|
| 1-1 | 7.6 | 35.8 | 21.2 | 240 | 100 | nearly columnar | 2.3 | 2.4 | 1.06 |
| 1-2 | 7.9 | 36.1 | 21.9 | 220 | 100 | nearly columnar | 2.4 | 2.4 | 1.00 |
| 1-3 | 6.9 | 35.7 | 19.3 | 220 | 80 | nearly columnar | 2.5 | 2.5 | 1.02 |
| 1-4 | 8.1 | 36.6 | 22.1 | 240 | 70 | nearly columnar | 2.6 | 2.7 | 1.04 |
| 1-5 | 7.6 | 36.1 | 21.1 | 240 | 70 | nearly columnar | 2.7 | 3.0 | 1.11 |
| 1-6 | 9.8 | 48.3 | 20.3 | 420 | 50 | nearly columnar | 2.8 | 2.4 | 0.87 |

TABLE 5-2-continued

| Expanded Beads | Δ $H_h$ (J/g) | Δ $H_t$ (J/g) | Δ $H_h$/Δ $H_t$ × 100 (%) | Average cell number per mm² | Average cell Diameter (μm) | Shape | Average maximum diameter D (mm) | Average maximum length L (mm) | L/D |
|---|---|---|---|---|---|---|---|---|---|
| 1-7 | 11.1 | 47.8 | 23.2 | 200 | 80 | nearly columnar | 3.0 | 2.8 | 0.94 |

Expanded Beads 1-1 to 1-7 were classified with a gravity separator into 13 kinds of expanded beads for the fabrication of the 13 layers of the dielectric lens. Each kind of the expanded beads was measured for the apparent density, standard deviation of the apparent density and standard deviation of the weight. The results are summarized in Table 6.

The "apparent density of the expanded beads" as used herein is measured as follows. At least 1,000 expanded beads (weight: W1) are allowed to stand at 23° C. for 48 hours in the atmosphere at 1 atm under 50% relative humidity and thereafter immersed in ethanol contained in a graduation cylinder at 23° C. using a metal mesh. From the rise of the level of the ethanol, the apparent volume (V1) of the expanded beads can be determined. The apparent density (g/cm³) is obtained by dividing the weight W1 (g) of the expanded beads by the volume V1 (cm³) thereof (density=W1/V1). The standard deviation of the apparent density is, however, calculated from the results of the measurement of the apparent density of individual bead as described previously.

Preparation of Moldings of Expanded Beads:

Each of the 13 kinds of expanded beads were placed in a pressurized tank having an inside pressure shown in Table 6 for 48 hours so that the expanded beads had the same inside pressure as the inside pressure of the tank. The 13 kinds of the expanded beads having the increased inside pressure were filled in respective molds, to which steam having the pressure shown in Table 6 was fed for fuse-bonding the beads together. The molds were then cooled to obtain 13 moldings of the expanded beads. One of moldings was a hemispherical layer for use as the innermost, 1st layer (center layer) of the dielectric lens, while the other moldings were hemispherical dome-shaped layers for use as the intermediate, 2nd to 12th layers and the outermost, 13th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm² and number of expanded beads (N) in the surface region. In this and succeeding Examples and Comparative Examples, when outer and inner surfaces of a dome-shaped layer have different V/N values, the smaller is shown in the tables. The results are summarized in Table 6. Each of the 1st to 13th layers was found to have an open cell content of 20% or less. The 1st to 13th layers were then integrated by fitting one into another in this order to form the 13-layered hemispherical lens having an overall apparent density of 0.17 g/cm³.

TABLE 6

| | | Layer | | | | | | | | | | | | |
|---|---|---|---|---|---|---|---|---|---|---|---|---|---|---|
| | | 1st | 2nd | 3rd | 4th | 5th | 6th | 7th | 8th | 9th | 10th | 11th | 12th | 13th |
| Expanded beads | Kind | 1-1 | 1-1 | 1-2 | 1-2 | 1-2 | 1-2 | 1-3 | 1-3 | 1-4 | 1-4 | 1-5 | 1-6 | 1-7 |
| | Apparent density (g/cm³) | 0.450 | 0.394 | 0.368 | 0.360 | 0.343 | 0.312 | 0.299 | 0.273 | 0.236 | 0.227 | 0.200 | 0.214 | 0.166 |
| | Standard deviation of apparent density (g/cm³) | 0.027 | 0.027 | 0.032 | 0.024 | 0.022 | 0.029 | 0.018 | 0.021 | 0.027 | 0.012 | 0.015 | 0.012 | 0.018 |
| | Standard deviation of weight (mg) | 0.13 | 0.13 | 0.10 | 0.11 | 0.09 | 0.13 | 0.16 | 0.12 | 0.12 | 0.11 | 0.13 | 0.07 | 0.09 |
| Molding Condition | Inside pressure of tank (MPaG) | 0.20 | 0.20 | 0.20 | 0.20 | 0.20 | 0.20 | 0.20 | 0.20 | 0.20 | 0.20 | 0.18 | 0.18 | 0.20 |
| | Steam pressure (MPaG) | 0.27 | 0.26 | 0.24 | 0.25 | 0.25 | 0.24 | 0.24 | 0.23 | 0.24 | 0.23 | 0.22 | 0.21 | 0.23 |
| Molding of expanded beads | Inside diameter (mm) | — | 199.0 | 249.2 | 299.0 | 348.6 | 398.8 | 448.6 | 499.4 | 549.6 | 598.6 | 648.0 | 696.6 | 746.0 |
| | Outside diameter (mm) | 199.0 | 248.8 | 299.0 | 348.6 | 398.2 | 448.6 | 497.8 | 548.2 | 597.8 | 647.2 | 696.2 | 745.2 | 793.8 |
| | Maleic anhydride content (wt %) | 0.31 | 0.31 | 0.31 | 0.31 | 0.31 | 0.31 | 0.31 | 0.31 | 0.31 | 0.31 | 0.31 | 0.31 | 0.31 |
| | Kind of ceramic | Cer 1 | Cer 1 | Cer 1 | Cer 1 | Cer 1 | Cer 1 | Cer 1 | Cer 1 | Cer 1 | Cer 1 | Cer 1 | Cer 1 | Cer 1 |
| | Ceramic content (g/cm³) | 0.152 | 0.146 | 0.141 | 0.136 | 0.130 | 0.122 | 0.113 | 0.104 | 0.093 | 0.082 | 0.068 | 0.044 | 0.032 |
| | Ceramic content (wt %) | 50 | 50 | 50 | 50 | 50 | 50 | 50 | 50 | 50 | 50 | 50 | 30 | 30 |
| | Apparent density (g/cm³) | 0.304 | 0.291 | 0.281 | 0.272 | 0.259 | 0.243 | 0.226 | 0.207 | 0.186 | 0.163 | 0.135 | 0.148 | 0.107 |

TABLE 6-continued

| | | | | | | Layer | | | | | | | |
|---|---|---|---|---|---|---|---|---|---|---|---|---|---|
| | 1st | 2nd | 3rd | 4th | 5th | 6th | 7th | 8th | 9th | 10th | 11th | 12th | 13th |
| Standard deviation of apparent density (g/cm$^3$) | 0.002 | 0.002 | 0.000 | 0.006 | 0.004 | 0.003 | 0.001 | 0.000 | 0.000 | 0.000 | 0.001 | 0.002 | 0.000 |
| Number of voids V | 310 | 288 | 336 | 286 | 226 | 271 | 306 | 179 | 287 | 153 | 241 | 205 | 135 |
| Number of voids with specific area | 265 | 253 | 316 | 261 | 208 | 252 | 261 | 160 | 270 | 138 | 214 | 199 | 130 |
| Number of expanded beads N | 431 | 443 | 415 | 403 | 410 | 398 | 397 | 381 | 383 | 348 | 354 | 373 | 301 |
| V/N | 0.72 | 0.65 | 0.81 | 0.71 | 0.55 | 0.68 | 0.77 | 0.47 | 0.75 | 0.44 | 0.68 | 0.55 | 0.45 |

EXAMPLE 2

A dielectric lens having a diameter of 370 mm and composed of 8 layers was produced as shown in Table 3. Two kinds of resin particles (Resin Particles 2-1 and 2-2) were prepared and were foamed and expanded by the dispersion method under various conditions to obtain six (6) kinds of expanded beads (Expanded Beads 2-1 to 2-6). The expanded beads were classified to obtain eight (8) kinds of expanded beads having varying apparent densities for the fabrication of the 8 layers of the dielectric lens. Detailed procedures are as follows.

Preparation of Resin Particles:

Resins (Resin 1 and Resin 3) shown in Table 1 and ceramic (Cer 2) shown in Table 2 were blended in the proportion shown in Table 7. Each blend was kneaded in a two-axis extruder, extruded and pelletized to obtain Resin Particles 2-1 and 2-2 in the form of columnar particles. The maleic anhydride contents of Resin Particles 2-1 and 2-2 are shown in Table 7.

TABLE 7

| | Ceramics | | | Maleic anhydride content (wt %) |
|---|---|---|---|---|
| Resin Particles | Kind | Amount (wt %) | Polypropylene resin Amount (wt %) | |
| 2-1 | Cer 2 | 60 | Resin 1/Resin 3 = 35/5 | 0.26 |
| 2-2 | Cer 2 | 20 | Resin 1/Resin 3 = 75/5 | 0.26 |

Preparation of Expanded Beads:

Resin Particles 2-1 and 2-2 were each foamed and expanded in the same manner as described in Example 1 except that the expansion temperature and pressure were as shown in Table 8-1. The thus obtained expanded beads (Expanded Beads 2-1 to 2-6) had the properties summarized in Table 8-2.

TABLE 8-1

| | | | Expansion Conditions | |
|---|---|---|---|---|
| Expanded Beads | Resin Particles | Blowing agent | Expansion temperature (° C.) | Expansion pressure (MPaG) |
| 2-1 | 2-1 | air | 149.0 | 2.6 |
| 2-2 | 2-1 | air | 149.0 | 2.8 |
| 2-3 | 2-1 | air | 149.0 | 3.0 |
| 2-4 | 2-1 | air | 149.0 | 3.5 |
| 2-5 | 2-1 | $CO_2$ | 146.0 | 3.3 |
| 2-6 | 2-2 | $CO_2$ | 144.5 | 3.4 |

TABLE 8-2

| Expanded Beads | $\Delta H_h$ (J/g) | $\Delta H_r$ (J/g) | $\Delta H_h/\Delta H_r \times 100$ (%) | Average cell number per mm$^2$ | Average cell Diameter (μm) | Shape | Average maximum diameter D (mm) | Average maximum length L (mm) | L/D |
|---|---|---|---|---|---|---|---|---|---|
| 2-1 | 5.6 | 27.1 | 20.7 | 550 | 40 | nearly columnar | 2.1 | 2.2 | 1.04 |
| 2-2 | 6.0 | 27.3 | 22.0 | 260 | 70 | nearly columnar | 2.3 | 2.4 | 1.04 |
| 2-3 | 5.7 | 26.9 | 21.2 | 380 | 40 | nearly columnar | 2.5 | 2.5 | 1.01 |
| 2-4 | 5.3 | 26.4 | 20.1 | 270 | 60 | nearly columnar | 2.8 | 2.7 | 0.95 |
| 2-5 | 5.3 | 24.9 | 21.3 | 410 | 40 | nearly columnar | 3.3 | 3.2 | 0.97 |
| 2-6 | 12.7 | 55.3 | 23.0 | 100 | 120 | nearly columnar | 3.6 | 3.4 | 1.06 |

Expanded Beads 2-1 to 2-6 were classified with a gravity separator into 8 kinds of expanded beads for the fabrication of the 8 layers of the dielectric lens. Each kind of the expanded beads was measured for the apparent density, standard deviation of the apparent density and standard deviation of the weight to give the results summarized in Table 9.

Preparation of Moldings of Expanded Beads:

Each of the 8 kinds of expanded beads were placed in a pressurized tank having an inside pressure shown in Table 9 for 48 hours so that the expanded beads had the same inside pressure as the inside pressure of the tank. The 8 kinds of the expanded beads having the increased inside pressure were filled in respective molds, to which steam having the pressure shown in Table 9 was fed for fuse-bonding the beads together. The molds were then cooled to obtain 8 moldings of the expanded beads. One of moldings was a hemispherical layer for use as the innermost, 1st layer of the dielectric lens, while the other moldings were hemispherical dome-shaped layers for use as the intermediate, 2nd to 7th layers and the outermost, 8th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm$^2$ and number of expanded beads (N) in the surface region. The results are summarized in Table 9. Each of the 1st to 8th layers was found to have an open cell content of 20% or less. The 1st to 8th layers were then integrated by fitting one into another in this order to form the 8-layered hemispherical lens having an overall apparent density of 0.20 g/cm$^3$.

TABLE 9

| | | Layer | | | | | | | |
|---|---|---|---|---|---|---|---|---|---|
| | | 1st | 2nd | 3rd | 4th | 5th | 6th | 7th | 8th |
| Expanded beads | Kind | 2-1 | 2-1 | 2-2 | 2-2 | 2-3 | 2-4 | 2-5 | 2-6 |
| | Apparent density (g/cm$^3$) | 0.717 | 0.612 | 0.562 | 0.523 | 0.437 | 0.336 | 0.211 | 0.095 |
| | Standard deviation of apparent density (g/cm$^3$) | 0.062 | 0.066 | 0.059 | 0.034 | 0.052 | 0.026 | 0.036 | 0.009 |
| | Standard deviation of weight (mg) | 0.14 | 0.11 | 0.11 | 0.13 | 0.10 | 0.10 | 0.13 | 0.08 |
| Molding Condition | Inside pressure of tank (MPaG) | 0.25 | 0.25 | 0.25 | 0.25 | 0.25 | 0.25 | 0.20 | 0.20 |
| | Steam pressure (MPaG) | 0.31 | 0.28 | 0.26 | 0.26 | 0.25 | 0.25 | 0.25 | 0.21 |
| Molding of expanded beads | Inside diameter (mm) | — | 97.8 | 143.6 | 179.8 | 217.0 | 259.6 | 301.0 | 337.0 |
| | Outside diameter (mm) | 97.6 | 143.4 | 179.2 | 217.0 | 258.8 | 300.8 | 335.6 | 367.4 |
| | Maleic anhydride content (wt %) | 0.26 | 0.26 | 0.26 | 0.26 | 0.26 | 0.26 | 0.26 | 0.26 |
| | Kind of ceramic | Cer 2 | Cer 2 | Cer 2 | Cer 2 | Cer 2 | Cer 2 | Cer 2 | Cer 2 |
| | Ceramic content (g/cm$^3$) | 0.266 | 0.240 | 0.220 | 0.200 | 0.170 | 0.130 | 0.080 | 0.012 |
| | Ceramic content (wt %) | 60 | 60 | 60 | 60 | 60 | 60 | 60 | 20 |
| | Apparent density (g/cm$^3$) | 0.444 | 0.400 | 0.367 | 0.333 | 0.284 | 0.217 | 0.134 | 0.060 |
| | Standard deviation of apparent density (g/cm$^3$) | 0.004 | 0.006 | 0.000 | 0.002 | 0.017 | 0.007 | 0.001 | 0.000 |
| | Number of voids V | 372 | 318 | 407 | 252 | 153 | 248 | 180 | 172 |
| | Number of voids with specific area | 339 | 295 | 370 | 244 | 144 | 238 | 160 | 160 |
| | Number of expanded beads N | 506 | 483 | 452 | 440 | 403 | 371 | 308 | 212 |
| | V/N | 0.74 | 0.66 | 0.90 | 0.57 | 0.38 | 0.67 | 0.58 | 0.81 |

EXAMPLE 3

A dielectric lens having a diameter of 450 mm and composed of 8 layers was produced as shown in Table 3. The same eight (8) kinds of expanded beads having varying apparent densities as used in Example 2 were used for the fabrication of the 8 layers of the dielectric lens in Example 3.

Preparation of Moldings of Expanded Beads:

Each of the 8 kinds of expanded beads were placed in a pressurized tank having an inside pressure shown in Table 10 for 48 hours so that the expanded beads had the same inside pressure as the inside pressure of the tank. The 8 kinds of the expanded beads having the increased inside pressure were filled in respective molds, to which steam having the pressure shown in Table 10 was fed for fuse-bonding the beads together. The molds were then cooled to obtain 8 moldings of the expanded beads. One of moldings was a hemispherical layer for use as the innermost, 1st layer of the dielectric lens, while the other moldings were hemispherical dome-like shells for use as the intermediate, 2nd to 7th layers and the outermost, 8th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm$^2$ and number of expanded beads (N) in the surface region. The results are summarized in Table 10. Each of the 1st to 8th layers was found to have an open cell content of 20% or less. The 1st to 8th layers were then integrated by fitting one into another in this order to form the 8-layered hemispherical lens having an overall apparent density of 0.20 g/cm$^3$.

TABLE 10

| | | Layer | | | | | | | |
|---|---|---|---|---|---|---|---|---|---|
| | | 1st | 2nd | 3rd | 4th | 5th | 6th | 7th | 8th |
| Expanded beads | Kind | 2-1 | 2-1 | 2-2 | 2-2 | 2-3 | 2-4 | 2-5 | 2-6 |
| | Apparent density (g/cm$^3$) | 0.717 | 0.612 | 0.562 | 0.523 | 0.437 | 0.336 | 0.211 | 0.095 |
| | Standard deviation of apparent density (g/cm$^3$) | 0.062 | 0.066 | 0.059 | 0.034 | 0.052 | 0.026 | 0.036 | 0.009 |
| | Standard deviation of weight (mg) | 0.14 | 0.11 | 0.11 | 0.13 | 0.10 | 0.10 | 0.13 | 0.08 |
| Molding Condition | Inside pressure of tank (MPaG) | 0.25 | 0.25 | 0.25 | 0.25 | 0.25 | 0.25 | 0.20 | 0.20 |
| | Steam pressure (MPaG) | 0.32 | 0.28 | 0.26 | 0.26 | 0.26 | 0.25 | 0.25 | 0.22 |
| Molding of expanded beads | Inside diameter (mm) | — | 120.0 | 173.8 | 219.8 | 265.8 | 315.8 | 366.6 | 410.6 |
| | Outside diameter (mm) | 119.4 | 173.0 | 219.2 | 264.8 | 315.0 | 366.4 | 410.0 | 447.0 |
| | Maleic anhydride content (wt %) | 0.26 | 0.26 | 0.26 | 0.26 | 0.26 | 0.26 | 0.26 | 0.26 |
| | Kind of ceramic | Cer 2 | Cer 2 | Cer 2 | Cer 2 | Cer 2 | Cer 2 | Cer 2 | Cer 2 |
| | Ceramic content (g/cm$^3$) | 0.267 | 0.239 | 0.220 | 0.200 | 0.172 | 0.130 | 0.081 | 0.012 |
| | Ceramic content (wt %) | 60 | 60 | 60 | 60 | 60 | 60 | 60 | 20 |
| | Apparent density (g/cm$^3$) | 0.445 | 0.398 | 0.367 | 0.334 | 0.287 | 0.217 | 0.135 | 0.062 |
| | Standard deviation of apparent density (g/cm$^3$) | 0.004 | 0.006 | 0.001 | 0.000 | 0.001 | 0.000 | 0.002 | 0.000 |
| | Number of voids V | 392 | 353 | 233 | 191 | 295 | 193 | 128 | 49 |
| | Number of voids with specific area | 349 | 328 | 219 | 185 | 262 | 181 | 125 | 47 |
| | Number of expanded beads N | 485 | 491 | 432 | 435 | 399 | 350 | 321 | 197 |
| | V/N | 0.81 | 0.72 | 0.54 | 0.44 | 0.74 | 0.55 | 0.40 | 0.25 |

EXAMPLE 4

A dielectric lens having a diameter of 800 mm and composed of 13 layers was produced as shown in Table 3. Using the same resin particles (Resin Particles 2-1 and 2-2) as used in Example 2, eight kinds of expanded beads (Expanded Beads 3-1 to 3-8) were prepared. The expanded beads were then classified to obtain 13 kinds of expanded beads having varying apparent densities for the fabrication of the 13 layers of the dielectric lens. Details of the preparation of the resin particles, preparation of expanded beads and preparation of moldings of the expanded beads are as follows.

Preparation of Expanded Beads:

Resin Particles 2-1 and 2-2 were each foamed and expanded in the same manner as described in Example 1 except that the expansion temperature and pressure were as shown in Table 11-1. The thus obtained expanded beads (Expanded Beads 3-1 to 3-8) had the properties summarized in Table 11-2.

TABLE 11-1

| Expanded Beads | Resin Particles | Expansion Conditions | | |
|---|---|---|---|---|
| | | Blowing agent | Expansion temperature (° C.) | Expansion pressure (MPaG) |
| 3-1 | 2-1 | air | 148.5 | 2.5 |
| 3-2 | 2-1 | air | 148.5 | 2.6 |
| 3-3 | 2-1 | air | 148.5 | 2.8 |
| 3-4 | 2-1 | air | 148.5 | 3.0 |
| 3-5 | 2-1 | air | 148.5 | 3.4 |
| 3-6 | 2-1 | $CO_2$ | 145.5 | 2.7 |
| 3-7 | 2-2 | air | 148.0 | 2.6 |
| 3-8 | 2-2 | air | 148.0 | 3.2 |

Expanded Beads 3-1 to 3-8 were classified with a gravity separator into 13 kinds of expanded beads for the fabrication of the 13 layers of the dielectric lens. Each kind of the expanded beads was measured for the apparent density, standard deviation of the apparent density and standard deviation of the weight. The results are summarized in Table 12.

Preparation of Moldings of Expanded Beads:

Each of the 13 kinds of expanded beads were placed in a pressurized tank having an inside pressure shown in Table 12 for 48 hours so that the expanded beads had the same inside pressure as the inside pressure of the tank. The 13 kinds of the expanded beads having the increased inside pressure were filled in respective molds, to which steam having the pressure shown in Table 12 was fed for fuse-bonding the beads together. The molds were then cooled to obtain 13 moldings of the expanded beads. One of moldings was a hemi-spherical layer for use as the innermost, 1st layer of the dielectric lens, while the other moldings were hemispherical dome-shaped layers for use as the intermediate, 2nd to 12th layers and the outermost, 13th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 $mm^2$ and number of expanded beads (N) in the surface region. The results are summarized in Table 12. Each of the 1st to 13th layers was found to have an open cell content of 20% or less. The 1st to 13th layers were then integrated by fitting one into another in this order to form the 13-layered hemispherical lens having an overall apparent density of 0.27 $g/cm^3$.

TABLE 11-2

| Expanded Beads | $\Delta H_h$ (J/g) | $\Delta H_t$ (J/g) | $\Delta H_h/\Delta H_t \times 100$ (%) | Average cell number per $mm^2$ | Average cell Diameter (μm) | Shape | Average maximum diameter D (mm) | Average maximum length L (mm) | L/D |
|---|---|---|---|---|---|---|---|---|---|
| 3-1 | 5.5 | 26.3 | 20.9 | 400 | 50 | nearly columnar | 2.1 | 2.1 | 1.01 |
| 3-2 | 4.9 | 25.9 | 18.9 | 320 | 70 | nearly columnar | 2.1 | 2.2 | 1.06 |
| 3-3 | 6.1 | 26.4 | 23.1 | 270 | 70 | nearly columnar | 2.3 | 2.4 | 1.04 |
| 3-4 | 5.6 | 26.4 | 21.2 | 240 | 80 | nearly columnar | 2.4 | 2.5 | 1.02 |
| 3-5 | 5.1 | 25.9 | 19.7 | 270 | 60 | nearly columnar | 2.6 | 2.6 | 1.00 |
| 3-6 | 5.2 | 25.5 | 20.4 | 240 | 70 | nearly columnar | 2.8 | 2.8 | 1.01 |
| 3-7 | 11.5 | 54.7 | 21.0 | 120 | 150 | nearly columnar | 2.6 | 2.6 | 0.98 |
| 3-8 | 12.1 | 54.9 | 22.0 | 100 | 130 | nearly columnar | 2.8 | 2.7 | 0.95 |

TABLE 12

| | | Layer | | | | | | | | | | | | |
|---|---|---|---|---|---|---|---|---|---|---|---|---|---|---|
| | | 1st | 2nd | 3rd | 4th | 5th | 6th | 7th | 8th | 9th | 10th | 11th | 12th | 13th |
| Expanded beads | Kind | 3-1 | 3-1 | 3-1 | 3-2 | 3-2 | 3-3 | 3-3 | 3-4 | 3-4 | 3-5 | 3-6 | 3-7 | 3-8 |
| | Apparent density (g/cm$^3$) | 0.716 | 0.643 | 0.613 | 0.593 | 0.574 | 0.546 | 0.493 | 0.441 | 0.385 | 0.351 | 0.296 | 0.341 | 0.239 |
| | Standard deviation of apparent density (g/cm$^3$) | 0.048 | 0.049 | 0.040 | 0.047 | 0.041 | 0.041 | 0.036 | 0.029 | 0.025 | 0.018 | 0.015 | 0.032 | 0.017 |
| | Standard deviation of weight (mg) | 0.12 | 0.10 | 0.10 | 0.11 | 0.07 | 0.09 | 0.11 | 0.09 | 0.10 | 0.09 | 0.09 | 0.07 | 0.07 |
| Molding Condition | Inside pressure of tank (MPaG) | 0.20 | 0.20 | 0.20 | 0.20 | 0.20 | 0.20 | 0.20 | 0.20 | 0.20 | 0.18 | 0.18 | 0.13 | 0.13 |
| | Steam pressure (MPaG) | 0.32 | 0.32 | 0.30 | 0.30 | 0.28 | 0.27 | 0.25 | 0.26 | 0.26 | 0.26 | 0.24 | 0.26 | 0.24 |
| Molding of expanded beads | Inside diameter (mm) | — | 199.0 | 249.2 | 299.0 | 348.6 | 398.8 | 448.6 | 499.4 | 548.6 | 598.6 | 648.0 | 696.6 | 746.6 |
| | Outside diameter (mm) | 199.0 | 248.8 | 299.0 | 348.6 | 398.2 | 448.6 | 497.8 | 548.2 | 597.2 | 647.2 | 696.2 | 745.2 | 793.8 |
| | Maleic anhydride content (wt %) | 0.26 | 0.26 | 0.26 | 0.26 | 0.26 | 0.26 | 0.26 | 0.26 | 0.26 | 0.26 | 0.26 | 0.26 | 0.26 |
| | Kind of ceramic | Cer 2 | Cer 2 | Cer 2 | Cer 2 | Cer 2 | Cer 2 | Cer 2 | Cer 2 | Cer 2 | Cer 2 | Cer 2 | Cer 2 | Cer 2 |
| | Ceramic content (g/cm$^3$) | 0.286 | 0.272 | 0.263 | 0.253 | 0.240 | 0.224 | 0.208 | 0.188 | 0.169 | 0.147 | 0.122 | 0.042 | 0.031 |
| | Ceramic content (wt %) | 60 | 60 | 60 | 60 | 60 | 60 | 60 | 60 | 60 | 60 | 60 | 20 | 20 |
| | Apparent density (g/cm$^3$) | 0.476 | 0.454 | 0.438 | 0.422 | 0.400 | 0.373 | 0.347 | 0.314 | 0.282 | 0.245 | 0.203 | 0.209 | 0.157 |
| | Standard deviation of apparent density (g/cm$^3$) | 0.003 | 0.003 | 0.003 | 0.004 | 0.000 | 0.002 | 0.001 | 0.003 | 0.004 | 0.000 | 0.003 | 0.002 | 0.001 |
| | Number of voids V | 380 | 331 | 279 | 239 | 436 | 337 | 358 | 201 | 214 | 344 | 273 | 168 | 163 |
| | Number of voids with specific area | 341 | 295 | 244 | 222 | 405 | 300 | 347 | 181 | 201 | 333 | 248 | 157 | 151 |
| | Number of expanded beads N | 535 | 501 | 507 | 497 | 496 | 444 | 442 | 419 | 396 | 391 | 369 | 381 | 363 |
| | V/N | 0.71 | 0.66 | 0.55 | 0.48 | 0.88 | 0.76 | 0.81 | 0.48 | 0.54 | 0.88 | 0.74 | 0.44 | 0.45 |

EXAMPLE 5

A dielectric lens having a diameter of 370 mm and composed of 8 layers was produced as shown in Table 3. The expanded beads used for the fabrication of the 1st to 4th layers and 6th to 8th layers of the dielectric lens in Example 2 were used for the preparation of the 1st to 4th layers and 6th to 8th layers, respectively, of the dielectric lens in Example 5. Expanded Beads 2-3 obtained in Example 2 were classified with a gravity separator to obtain expanded beads for the fabrication of the 5th layer of the dielectric lens of Example 5. The apparent density, standard deviation of the apparent density and standard deviation of the weight of the expanded beads for use as the 8 layers are summarized in Table 13.

Preparation of Moldings of Expanded Beads:

Each of the 8 kinds of expanded beads were placed in a pressurized tank having an inside pressure shown in Table 13 for 48 hours so that the expanded beads had the same inside pressure as the inside pressure of the tank. The 8 kinds of the expanded beads having the increased inside pressure were filled in respective molds, to which steam having the pressure shown in Table 13 was fed for fuse-bonding the beads together. The molds were then cooled to obtain 8 moldings of the expanded beads. One of moldings was a hemispherical layer for use as the innermost, 1st layer of the dielectric lens, while the other moldings were hemispherical dome-shaped layers for use as the intermediate, 2nd to 7th layers and the outermost, 8th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm$^2$ and number of expanded beads (N) in the surface region. The results are summarized in Table 13. Each of the 1st to 8th layers was found to have an open cell content of 20% or less. The 1st to 8th layers were then integrated by fitting one into another in this order to form the 8-layered hemispherical lens having an overall apparent density of 0.20 g/cm$^3$.

TABLE 13

|  |  | Layer | | | | | | | |
| --- | --- | --- | --- | --- | --- | --- | --- | --- | --- |
|  |  | 1st | 2nd | 3rd | 4th | 5th | 6th | 7th | 8th |
| Expanded beads | Kind | 2-1 | 2-1 | 2-2 | 2-2 | 2-3 | 2-4 | 2-5 | 2-6 |
|  | Apparent density (g/cm³) | 0.717 | 0.612 | 0.562 | 0.523 | 0.500 | 0.336 | 0.211 | 0.095 |
|  | Standard deviation of apparent density (g/cm³) | 0.062 | 0.066 | 0.059 | 0.034 | 0.055 | 0.026 | 0.036 | 0.009 |
|  | Standard deviation of weight (mg) | 0.14 | 0.11 | 0.11 | 0.13 | 0.10 | 0.10 | 0.13 | 0.08 |
| Molding Condition | Inside pressure of tank (MPaG) | 0.25 | 0.25 | 0.25 | 0.25 | 0.25 | 0.25 | 0.20 | 0.20 |
|  | Steam pressure (MPaG) | 0.31 | 0.28 | 0.26 | 0.26 | 0.25 | 0.25 | 0.25 | 0.21 |
| Molding of expanded beads | Inside diameter (mm) | — | 97.8 | 143.6 | 179.8 | 217.0 | 259.6 | 301.0 | 337.0 |
|  | Outside diameter (mm) | 97.6 | 143.4 | 179.2 | 217.0 | 258.8 | 300.8 | 335.6 | 367.4 |
|  | Maleic anhydride content (wt %) | 0.26 | 0.26 | 0.26 | 0.26 | 0.26 | 0.26 | 0.26 | 0.26 |
|  | Kind of ceramic | Cer 2 | Cer 2 | Cer 2 | Cer 2 | Cer 2 | Cer 2 | Cer 2 | Cer 2 |
|  | Ceramic content (g/cm³) | 0.266 | 0.240 | 0.220 | 0.200 | 0.201 | 0.130 | 0.080 | 0.012 |
|  | Ceramic content (wt %) | 60 | 60 | 60 | 60 | 60 | 60 | 60 | 20 |
|  | Apparent density (g/cm³) | 0.444 | 0.400 | 0.367 | 0.333 | 0.335 | 0.217 | 0.134 | 0.060 |
|  | Standard deviation of apparent density (g/cm³) | 0.004 | 0.006 | 0.000 | 0.002 | 0.017 | 0.007 | 0.001 | 0.000 |
|  | Number of voids V | 372 | 318 | 407 | 252 | 235 | 248 | 180 | 172 |
|  | Number of voids with specific area | 339 | 295 | 370 | 244 | 219 | 238 | 160 | 160 |
|  | Number of expanded beads N | 506 | 483 | 452 | 440 | 431 | 371 | 308 | 212 |
|  | V/N | 0.74 | 0.66 | 0.90 | 0.57 | 0.55 | 0.67 | 0.58 | 0.81 |

EXAMPLE 6

A dielectric lens having a diameter of 800 mm and composed of 13 layers was produced as shown in Table 3. The expanded beads used for the preparation of the 1st to 7th layers and 9th to 13th layers of the dielectric lens in Example 4 were used for the preparation of the 1st to 7th layers and 9th to 13th layers, respectively, of the dielectric lens in Example 6. Resin Particles 2-1 obtained in Example 2 were foamed and expanded by the dispersion method to obtain expanded beads (Expanded Beads 4-1) from which expanded beads for the production of the 8th layer of the dielectric lens of Example 6 were prepared by classification. Details of the preparation of the expanded beads and preparation of moldings thereof are as follows.

Preparation of Expanded Beads:

Resin Particles 2-1 were foamed and expanded in the same manner as described in Example 1 except that the expansion temperature and pressure were as shown in Table 14-1. The thus obtained expanded beads (Expanded Beads 4-1) had the properties summarized in Table 14-2.

TABLE 14-1

|  |  | Expansion Conditions | | |
| --- | --- | --- | --- | --- |
| Expanded Beads | Resin Particles | Blowing agent | Expansion temperature (° C.) | Expansion pressure (MPaG) |
| 4-1 | 2-1 | air | 151.0 | 2.2 |

Expanded Beads 4-1 were classified with a gravity separator to obtain the expanded beads for use as the 8th layer of the dielectric lens. The apparent density, standard deviation of the apparent density and standard deviation of the weight of the expanded beads for the 13 layers of the dielectric lens are summarized in Table 15.

Preparation of Moldings of Expanded Beads:

Each of the 13 kinds of expanded beads were placed in a pressurized tank having an inside pressure shown in Table 15 for 48 hours so that the expanded beads had the same inside pressure as the inside pressure of the tank. The 13 kinds of the expanded beads having the increased inside pressure were filled in respective molds, to which steam having the pressure shown in Table 15 was fed for fuse-bonding the beads together. The molds were then cooled to obtain 13 moldings of the expanded beads. One of moldings was a hemispherical layer for use as the innermost, 1st layer of the dielectric lens, while the other moldings were hemispherical dome-shaped layers for use as the intermediate, 2nd to 12th layers and the outermost, 13th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm$^2$ and number of expanded beads (N) in the surface region. The results are summarized in Table 15. Each of the 1st to 13th layers was found to have an open cell content of 20% or less. The 1st to 13th layers were then integrated by fitting one into another in this order to form the 13-layered hemispherical lens having an overall apparent density of 0.27 g/cm$^3$.

TABLE 14-2

| Expanded Beads | $\Delta H_h$ (J/g) | $\Delta H_r$ (J/g) | $\Delta H_h/\Delta H_r \times 100$ (%) | Average cell number per mm$^2$ | Average cell Diameter (μm) | Shape | Average max. diameter D (mm) | Average max. length L (mm) | L/D |
|---|---|---|---|---|---|---|---|---|---|
| 4-1 | 3.7 | 25.9 | 14.3 | 150 | 100 | nearly columnar | 2.6 | 2.4 | 0.92 |

TABLE 15

| | | Layer | | | | | | | | | | | | |
|---|---|---|---|---|---|---|---|---|---|---|---|---|---|---|
| | | 1st | 2nd | 3rd | 4th | 5th | 6th | 7th | 8th | 9th | 10th | 11th | 12th | 13th |
| Expanded beads | Kind | 3-1 | 3-1 | 3-1 | 3-2 | 3-2 | 3-3 | 3-3 | 4-1 | 3-4 | 3-5 | 3-6 | 3-7 | 3-8 |
| | Apparent density (g/cm$^3$) | 0.716 | 0.643 | 0.613 | 0.593 | 0.574 | 0.546 | 0.493 | 0.389 | 0.385 | 0.351 | 0.296 | 0.341 | 0.239 |
| | Standard deviation of apparent density (g/cm$^3$) | 0.048 | 0.049 | 0.040 | 0.047 | 0.041 | 0.041 | 0.036 | 0.045 | 0.025 | 0.018 | 0.015 | 0.032 | 0.017 |
| | Standard deviation of weight (mg) | 0.12 | 0.10 | 0.10 | 0.11 | 0.07 | 0.09 | 0.11 | 0.13 | 0.10 | 0.09 | 0.09 | 0.07 | 0.07 |
| Molding Condition | Inside pressure of tank (MPaG) | 0.20 | 0.20 | 0.20 | 0.20 | 0.20 | 0.20 | 0.20 | 0.25 | 0.20 | 0.18 | 0.18 | 0.13 | 0.13 |
| | Steam pressure (MPaG) | 0.32 | 0.32 | 0.30 | 0.30 | 0.28 | 0.27 | 0.25 | 0.40 | 0.26 | 0.26 | 0.24 | 0.26 | 0.24 |
| Molding of expanded beads | Inside diameter (mm) | — | 199.0 | 249.2 | 299.0 | 348.6 | 398.8 | 448.6 | 499.4 | 548.6 | 598.6 | 648.0 | 696.6 | 746.6 |
| | Outside diameter (mm) | 199.0 | 248.8 | 299.0 | 348.6 | 398.2 | 448.6 | 497.8 | 548.2 | 597.2 | 647.2 | 696.2 | 745.2 | 793.8 |
| | Maleic anhydride content (wt %) | 0.26 | 0.26 | 0.26 | 0.26 | 0.26 | 0.26 | 0.26 | 0.26 | 0.26 | 0.26 | 0.26 | 0.26 | 0.26 |
| | Kind of ceramic | Cer 2 | Cer 2 | Cer 2 | Cer 2 | Cer 2 | Cer 2 | Cer 2 | Cer 2 | Cer 2 | Cer 2 | Cer 2 | Cer 2 | Cer 2 |
| | Ceramic content (g/cm$^3$) | 0.286 | 0.272 | 0.263 | 0.253 | 0.240 | 0.224 | 0.208 | 0.190 | 0.169 | 0.147 | 0.122 | 0.042 | 0.031 |
| | Ceramic content (wt %) | 60 | 60 | 60 | 60 | 60 | 60 | 60 | 60 | 60 | 60 | 60 | 20 | 20 |
| | Apparent density (g/cm$^3$) | 0.476 | 0.454 | 0.438 | 0.422 | 0.400 | 0.373 | 0.347 | 0.317 | 0.282 | 0.245 | 0.203 | 0.209 | 0.157 |
| | Standard deviation of apparent density (g/cm$^3$) | 0.003 | 0.003 | 0.003 | 0.004 | 0.000 | 0.002 | 0.001 | 0.050 | 0.004 | 0.000 | 0.003 | 0.002 | 0.001 |
| | Number of voids V | 380 | 331 | 279 | 239 | 436 | 337 | 358 | 16 | 214 | 344 | 273 | 168 | 163 |
| | Number of voids with specific area | 341 | 295 | 244 | 222 | 405 | 300 | 347 | 16 | 201 | 333 | 248 | 157 | 151 |
| | Number of expanded beads N | 535 | 501 | 507 | 497 | 496 | 444 | 442 | 401 | 396 | 391 | 369 | 381 | 363 |
| | V/N | 0.71 | 0.66 | 0.55 | 0.48 | 0.88 | 0.76 | 0.81 | 0.04 | 0.54 | 0.88 | 0.74 | 0.44 | 0.45 |

EXAMPLE 7

A dielectric lens having a diameter of 370 mm and composed of 8 layers was produced as shown in Table 3. The expanded beads used for the preparation of the 1st to 8th layers of the dielectric lens in Example 2 were used for the preparation of the 1st to 8th layers, respectively, of the dielectric lens in Example 7.

Preparation of Moldings of Expanded Beads:

Each of the 8 kinds of expanded beads were placed in a pressurized tank having an inside pressure shown in Table 16 for 48 hours so that the expanded beads had the same inside pressure as the inside pressure of the tank. The 8 kinds of the expanded beads having the increased inside pressure were filled in respective molds, to which steam having the pressure shown in Table 16 was fed for fuse-bonding the beads together. The molds were then cooled to obtain 8 moldings of the expanded beads. One of moldings was a hemispherical layer for use as the innermost, 1st layer of the dielectric lens, while the other moldings were hemispherical dome-shaped layers for use as the intermediate, 2nd to 7th layers and the outermost, 8th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm$^2$ and number of expanded beads (N) in the surface region. The results are summarized in Table 16. Each of the 1st to 8th layers was found to have an open cell content of 20% or less. The 1st to 8th layers were then integrated by fitting one into another in this order to form the 8-layered hemispherical lens having an overall apparent density of 0.20 g/cm$^3$.

TABLE 16

|  |  | Layer | | | | | | | |
| --- | --- | --- | --- | --- | --- | --- | --- | --- | --- |
|  |  | 1st | 2nd | 3rd | 4th | 5th | 6th | 7th | 8th |
| Expanded beads | Kind | 2-1 | 2-1 | 2-2 | 2-2 | 2-3 | 2-4 | 2-5 | 2-6 |
|  | Apparent density (g/cm$^3$) | 0.717 | 0.612 | 0.562 | 0.523 | 0.437 | 0.336 | 0.211 | 0.095 |
|  | Standard deviation of apparent density (g/cm$^3$) | 0.062 | 0.066 | 0.059 | 0.034 | 0.052 | 0.026 | 0.036 | 0.009 |
|  | Standard deviation of weight (mg) | 0.14 | 0.11 | 0.11 | 0.13 | 0.10 | 0.10 | 0.13 | 0.08 |
| Molding Condition | Inside pressure of tank (MPaG) | 0.25 | 0.25 | 0.25 | 0.25 | 0.25 | 0.25 | 0.20 | 0.20 |
|  | Steam pressure (MPaG) | 0.31 | 0.28 | 0.26 | 0.26 | 0.40 | 0.25 | 0.25 | 0.21 |
| Molding of expanded bead | Inside diameter (mm) | — | 97.8 | 143.6 | 179.8 | 217.2 | 259.6 | 301.0 | 337.0 |
|  | Outside diameter (mm) | 97.6 | 143.4 | 179.2 | 217.0 | 259.0 | 300.8 | 335.6 | 367.4 |
|  | Maleic anhydride content (wt %) | 0.26 | 0.26 | 0.26 | 0.26 | 0.26 | 0.26 | 0.26 | 0.26 |
|  | Kind of ceramic | Cer 2 | Cer 2 | Cer 2 | Cer 2 | Cer 2 | Cer 2 | Cer 2 | Cer 2 |
|  | Ceramic content (g/cm$^3$) | 0.266 | 0.240 | 0.220 | 0.200 | 0.170 | 0.130 | 0.080 | 0.012 |
|  | Ceramic content (wt %) | 60 | 60 | 60 | 60 | 60 | 60 | 60 | 20 |
|  | Apparent density (g/cm$^3$) | 0.444 | 0.400 | 0.367 | 0.333 | 0.284 | 0.217 | 0.134 | 0.060 |
|  | Standard deviation of apparent density (g/cm$^3$) | 0.004 | 0.006 | 0.000 | 0.002 | 0.021 | 0.007 | 0.001 | 0.000 |
|  | Number of voids V | 372 | 318 | 407 | 252 | 42 | 248 | 180 | 172 |
|  | Number of voids with specific area | 339 | 295 | 370 | 244 | 39 | 238 | 160 | 160 |
|  | Number of expanded beads N | 506 | 483 | 452 | 440 | 390 | 371 | 308 | 212 |
|  | V/N | 0.74 | 0.66 | 0.90 | 0.57 | 0.11 | 0.67 | 0.58 | 0.81 |

COMPARATIVE EXAMPLE 1

A dielectric lens having a diameter of 370 mm and composed of 8 layers was produced as shown in Table 3. The expanded beads used for the preparation of the 1st to 4th layers and 7th and 8th layers of the dielectric lens of Example 2 were used for the preparation of the 1st to 4th layers and 7th and 8th layers, respectively, of the dielectric lens in Comparative Example 1. Expanded Beads 4-1 obtained in Example 6 were classified to obtain expanded beads for the preparation of the sixth layer in Comparative Example 1. Resin Particles 2-1 obtained in Example 2 were foamed and expanded by the dispersion method to obtain expanded beads (Expanded Beads 5-1) from which expanded beads for the production of the 5th layer in Comparative Example 1 were prepared by classification. Details of the preparation of the expanded beads and preparation of moldings thereof are as follows.

Preparation of Expanded Beads:

Resin Particles 2-1 were foamed and expanded in the same manner as described in Example 1 except that the expansion temperature and pressure were as shown in Table 17-1. The thus obtained expanded beads (Expanded Beads 5-1) had the properties summarized in Table 17-2.

TABLE 17-1

| | | Expansion Conditions | | |
|---|---|---|---|---|
| Expanded Beads | Resin Particles | Blowing agent | Expansion temperature (° C.) | Expansion pressure (MPaG) |
| 5-1 | 2-1 | air | 151.0 | 2.8 |

TABLE 17-2

| Expanded Beads | Δ H$_h$ (J/g) | Δ H$_t$ (J/g) | Δ H$_h$/Δ H$_t$ × 100 (%) | Average cell number per mm² | Average cell Diameter (μm) | Shape | Average max. diameter D (mm) | Average max. length L (mm) | L/D |
|---|---|---|---|---|---|---|---|---|---|
| 5-1 | 3.3 | 26.0 | 12.7 | 220 | 80 | nearly columnar | 2.8 | 2.6 | 0.94 |

Expanded Beads 5-1 were classified with a gravity separator to obtain the expanded beads for use as the 5th layer of the dielectric lens. The apparent density, standard deviation of the apparent density and standard deviation of the weight of the expanded beads for use as the 8 layers of the dielectric lens are summarized in Table 18.

Preparation of Moldings of Expanded Beads:

Each of the 8 kinds of expanded beads were placed in a pressurized tank having an inside pressure shown in Table 18 for 48 hours so that the expanded beads had the same inside pressure as the inside pressure of the tank. The 8 kinds of the expanded beads having the increased inside pressure were filled in respective molds, to which steam having the pressure shown in Table 18 was fed for fuse-bonding the beads together. The molds were then cooled to obtain 8 moldings of the expanded beads. One of moldings was a hemispherical layer for use as the innermost, 1st layer of the dielectric lens, while the other moldings were hemispherical dome-shaped layers for use as the intermediate, 2nd to 7th layers and the outermost, 8th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm² and number of expanded beads (N) in the surface region. The results are summarized in Table 18. Each of the 1st to 8th layers was found to have an open cell content of 20% or less. The 1st to 8th layers were then integrated by fitting one into another in this order to form the 8-layered hemispherical lens having an overall apparent density of 0.20 g/cm³.

TABLE 18

| | | Layer | | | | | | | |
|---|---|---|---|---|---|---|---|---|---|
| | | 1st | 2nd | 3rd | 4th | 5th | 6th | 7th | 8th |
| Expanded beads | Kind | 2-1 | 2-1 | 2-2 | 2-2 | 5-1 | 4-1 | 2-5 | 2-6 |
| | Apparent density (g/cm³) | 0.717 | 0.612 | 0.562 | 0.523 | 0.334 | 0.338 | 0.211 | 0.095 |
| | Standard deviation of apparent density (g/cm³) | 0.062 | 0.066 | 0.059 | 0.034 | 0.036 | 0.055 | 0.036 | 0.009 |
| | Standard deviation of weight (mg) | 0.14 | 0.11 | 0.11 | 0.13 | 0.13 | 0.12 | 0.13 | 0.08 |
| Molding Condition | Inside pressure of tank (MPaG) | 0.28 | 0.28 | 0.28 | 0.28 | 0.28 | 0.28 | 0.25 | 0.25 |
| | Steam pressure (MPaG) | 0.38 | 0.36 | 0.40 | 0.33 | 0.33 | 0.34 | 0.29 | 0.24 |

TABLE 18-continued

|  |  | Layer | | | | | | | |
| --- | --- | --- | --- | --- | --- | --- | --- | --- | --- |
|  |  | 1st | 2nd | 3rd | 4th | 5th | 6th | 7th | 8th |
| Molding of expanded beads | Inside diameter (mm) | — | 97.8 | 143.6 | 179.8 | 217.0 | 259.7 | 301.0 | 337.1 |
|  | Outside diameter (mm) | 97.6 | 143.4 | 179.2 | 216.9 | 258.8 | 300.8 | 335.6 | 367.4 |
|  | Maleic anhydride content (wt %) | 0.26 | 0.26 | 0.26 | 0.26 | 0.26 | 0.26 | 0.26 | 0.26 |
|  | Kind of ceramic | Cer 2 | Cer 2 | Cer 2 | Cer 2 | Cer 2 | Cer 2 | Cer 2 | Cer 2 |
|  | Ceramic content (g/cm$^3$) | 0.267 | 0.242 | 0.220 | 0.197 | 0.131 | 0.172 | 0.082 | 0.012 |
|  | Ceramic content (wt %) | 60 | 60 | 60 | 60 | 60 | 60 | 60 | 20 |
|  | Apparent density (g/cm$^3$) | 0.445 | 0.403 | 0.366 | 0.328 | 0.219 | 0.287 | 0.136 | 0.061 |
|  | Standard deviation of apparent density (g/cm$^3$) | 0.009 | 0.009 | 0.022 | 0.004 | 0.028 | 0.050 | 0.007 | 0.003 |
|  | Number of voids V | 288 | 168 | 70 | 230 | 86 | 18 | 170 | 98 |
|  | Number of voids with specific area | 254 | 151 | 62 | 215 | 75 | 16 | 158 | 95 |
|  | Number of expanded beads N | 497 | 479 | 471 | 430 | 411 | 355 | 293 | 183 |
|  | V/N | 0.58 | 0.36 | 0.15 | 0.53 | 0.21 | 0.05 | 0.58 | 0.54 |

COMPARATIVE EXAMPLE 2

A dielectric lens having a diameter of 800 mm and composed of 13 layers was produced as shown in Table 3. The expanded beads used for the fabrication of the 1st to 7th, 10th, 12th and 13th layers of the dielectric lens in Example 4 were used for the preparation of the 1st to 7th, 10th, 12th and 13th layers, respectively, of the dielectric lens in Comparative Example 2. The expanded beads used for the fabrication of the 11th layer in Example 4 were used for the preparation of the 9th layer in Comparative Example 2. Resin Particles 2-1 obtained in Example 2 were foamed and expanded by the dispersion method to obtain expanded beads (Expanded Beads 6-1) from which two kinds of expanded beads for the preparation of the 8th and 11th layers of the dielectric lens of Comparative Example 2 were prepared by classification. Details of the preparation of the expanded beads and preparation of moldings thereof are as follows.

Preparation of Expanded Beads:

Resin Particles 2-1 were foamed and expanded in the same manner as described in Example 1 except that the expansion temperature and pressure were as shown in Table 19-1. The thus obtained expanded beads (Expanded Beads 6-1) had the properties summarized in Table 19-2.

TABLE 19-1

| | | Expansion Conditions | | |
| --- | --- | --- | --- | --- |
| Expanded Beads | Resin Particles | Blowing agent | Expansion temperature (° C.) | Expansion pressure (MPaG) |
| 6-1 | 2-1 | air | 151.5 | 1.8 |

TABLE 19-2

| Expanded Beads | $\Delta H_h$ (J/g) | $\Delta H_r$ (J/g) | $\Delta H_h / \Delta H_r \times 100$ (%) | Average cell number per mm$^2$ | Average cell Diameter (μm) | Shape | Average max. diameter D (mm) | Average max. length L (mm) | L/D |
| --- | --- | --- | --- | --- | --- | --- | --- | --- | --- |
| 6-1 | 2.6 | 25.8 | 10.1 | 240 | 80 | nearly columnar | 2.7 | 2.4 | 0.91 |

Expanded Beads 6-1 were classified with a gravity separator to obtain expanded beads for use as the 8th and 11th layers of the dielectric lens. The apparent density, standard deviation of the apparent density and standard deviation of the weight of the expanded beads for use as the 13 layers of the dielectric lens are summarized in Table 20.

Preparation of Moldings of Expanded Beads:

Each of the 13 kinds of expanded beads were placed in a pressurized tank having an inside pressure shown in Table 20 for 48 hours so that the expanded beads had the same inside pressure as the inside pressure of the tank. The 13 kinds of the expanded beads having the increased inside pressure were filled in respective molds, to which steam having the pressure shown in Table 20 was fed for fuse-bonding the beads together. The molds were then cooled to obtain 13 moldings of the expanded beads. One of moldings was a hemispherical layer for use as the innermost, 1st layer of the dielectric lens, while the other moldings were hemispherical dome-like shells for use as the intermediate, 2nd to 12th layers and the outermost, 13th layer.

Each of the moldings was aged at 60° C. under atmospheric pressure for 24 hours and then allowed to stand at 23° C. under atmospheric pressure for 48 hours. Thereafter, each molding was measured for the inside diameter, outside diameter, ceramic content per unit volume, ceramic content per unit weight, apparent density, standard deviation of the apparent density, number of voids (V) in a surface region, number of voids with specific area of 0.3 to 2.5 mm$^2$ and number of expanded beads (N) in the surface region. The results are summarized in Table 20. Each of the 1st to 13th layers was found to have an open cell content of 20% or less. The 1st to 13th layers were then integrated by fitting one into another in this order to form the 13-layered hemispherical lens having an overall apparent density of 0.27 g/cm$^3$.

In Examples 1-7 and Comparative Examples 1 and 2, the calorific value ($\Delta H_h$) of the high temperature peak, calorific value ($\Delta H_t$) of the whole endothermic peaks, percentage calorific value ($\Delta H_h/\Delta H_t \times 100$) of the high temperature peak based on the whole endothermic peaks, average cell number per mm$^2$ of the cross-section and average cell diameter in the cross-section of each of the moldings were found to be similar to those of the expanded beads from which the corresponding molding was produced.

Figure 7:
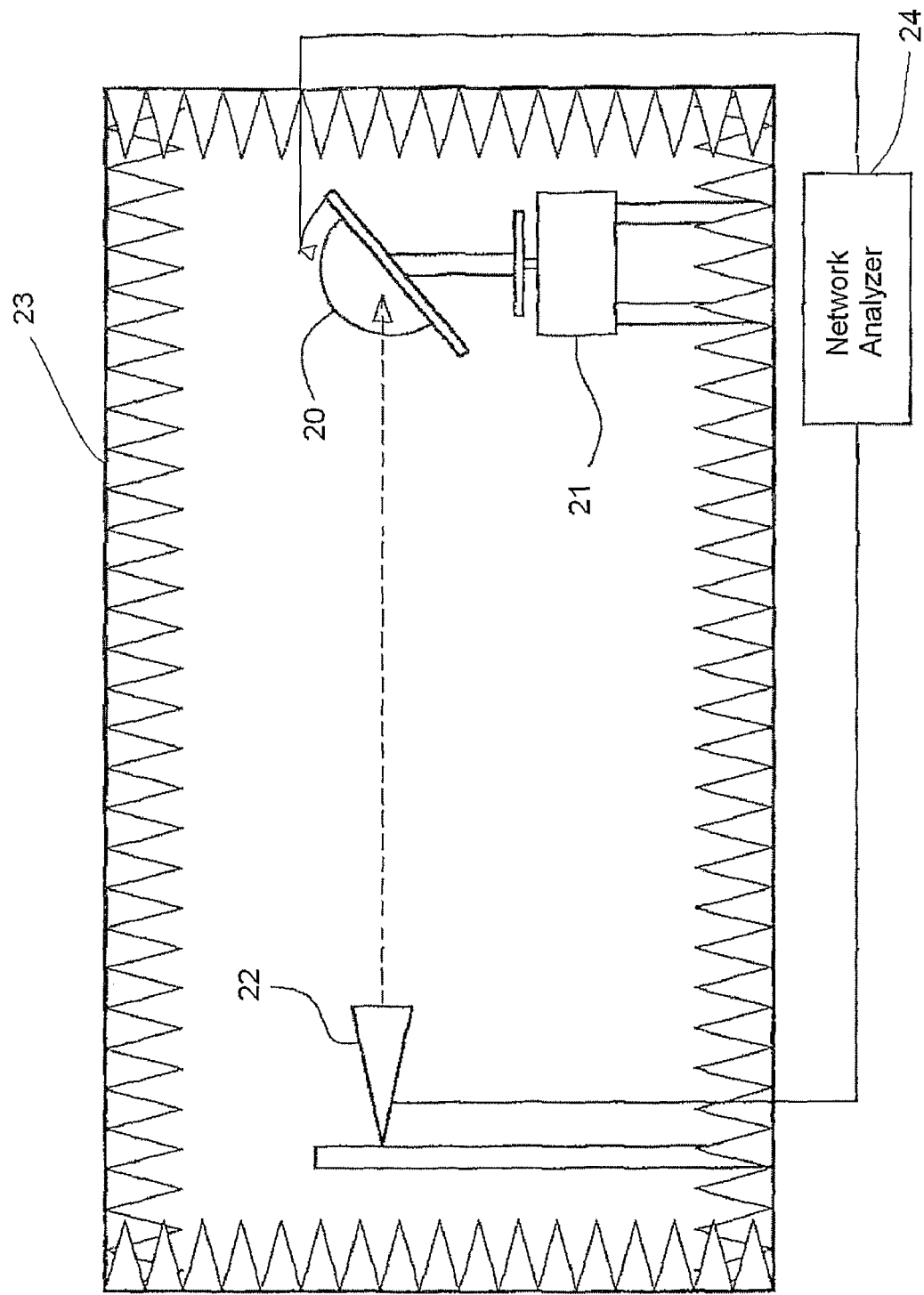
FIG. 7 is a schematic view explanatory of a system for measuring the antenna gain of a Luneberg antenna.

Each of the 8-layered or 13-layered Luneberg dielectric lenses obtained in Examples 1-7 and Comparative Examples 1 and 2 was measured for the antenna gain thereof using the system shown in FIG. 7. An antenna 20 provided with the Luneberg dielectric lens to be tested was placed on a rotatable table 21 disposed within an anechoic chamber 22. A radiowave of 11.7 GHz was transmitted from a transmission antenna 23 and received by the Luneberg dielectric lens. The antenna gain was measured with a network analyzer 24. The results are shown in Table 21.

TABLE 20

| | | Layer | | | | | | | | | | | | |
|---|---|---|---|---|---|---|---|---|---|---|---|---|---|---|
| | | 1st | 2nd | 3rd | 4th | 5th | 6th | 7th | 8th | 9th | 10th | 11th | 12th | 13th |
| Expanded beads | Kind | 3-1 | 3-1 | 3-1 | 3-2 | 3-2 | 3-3 | 3-3 | 6-1 | 3-6 | 3-5 | 6-1 | 3-7 | 3-8 |
| | Apparent density (g/cm$^3$) | 0.716 | 0.643 | 0.613 | 0.593 | 0.574 | 0.546 | 0.493 | 0.388 | 0.296 | 0.351 | 0.388 | 0.341 | 0.239 |
| | Standard deviation of apparent density (g/cm$^3$) | 0.048 | 0.049 | 0.040 | 0.047 | 0.041 | 0.041 | 0.036 | 0.022 | 0.015 | 0.018 | 0.022 | 0.032 | 0.017 |
| | Standard deviation of weight (mg) | 0.12 | 0.10 | 0.10 | 0.11 | 0.07 | 0.09 | 0.11 | 0.11 | 0.09 | 0.09 | 0.11 | 0.07 | 0.07 |
| Molding Condition | Inside pressure of tank (MPaG) | 0.20 | 0.20 | 0.20 | 0.20 | 0.20 | 0.20 | 0.20 | 0.13 | 0.18 | 0.25 | 0.25 | 0.13 | 0.13 |
| | Steam pressure (MPaG) | 0.32 | 0.32 | 0.30 | 0.30 | 0.28 | 0.27 | 0.25 | 0.34 | 0.24 | 0.34 | 0.34 | 0.26 | 0.24 |
| Molding of expanded beads | Inside diameter (mm) | — | 199.0 | 249.2 | 299.0 | 348.8 | 398.6 | 448.6 | 498.4 | 548.6 | 598.6 | 648.0 | 696.8 | 746.6 |
| | Outside diameter (mm) | 198.8 | 248.9 | 299.0 | 348.6 | 398.2 | 448.6 | 497.8 | 548.6 | 597.0 | 647.4 | 696.2 | 745.2 | 793.8 |
| | Maleic anhydride content (wt %) | 0.26 | 0.26 | 0.26 | 0.26 | 0.26 | 0.26 | 0.26 | 0.26 | 0.26 | 0.26 | 0.26 | 0.26 | 0.26 |
| | Kind of ceramic | Cer 2 | Cer 2 | Cer 2 | Cer 2 | Cer 2 | Cer 2 | Cer 2 | Cer 2 | Cer 2 | Cer 2 | Cer 2 | Cer 2 | Cer 2 |
| | Ceramic content (g/cm$^3$) | 0.284 | 0.271 | 0.263 | 0.253 | 0.239 | 0.223 | 0.207 | 0.208 | 0.120 | 0.148 | 0.169 | 0.045 | 0.031 |
| | Ceramic content (wt %) | 60 | 60 | 60 | 60 | 60 | 60 | 60 | 60 | 60 | 60 | 60 | 20 | 20 |
| | Apparent density (g/cm$^3$) | 0.473 | 0.451 | 0.438 | 0.421 | 0.399 | 0.371 | 0.345 | 0.347 | 0.200 | 0.247 | 0.282 | 0.224 | 0.153 |
| | Standard deviation of apparent density (g/cm$^3$) | 0.003 | 0.003 | 0.003 | 0.004 | 0.000 | 0.002 | 0.001 | 0.060 | 0.003 | 0.023 | 0.050 | 0.002 | 0.001 |
| | Number of voids V | 383 | 311 | 275 | 348 | 327 | 382 | 315 | 32 | 227 | 73 | 57 | 277 | 253 |
| | Number of voids with specific area | 344 | 288 | 259 | 320 | 315 | 366 | 296 | 30 | 210 | 72 | 51 | 251 | 245 |
| | Number of expanded beads N | 511 | 522 | 518 | 483 | 481 | 472 | 438 | 454 | 421 | 387 | 359 | 391 | 347 |
| | V/N | 0.75 | 0.60 | 0.53 | 0.72 | 0.68 | 0.81 | 0.72 | 0.07 | 0.54 | 0.19 | 0.16 | 0.71 | 0.73 |

TABLE 21

| Example | Diameter (mm) | Number of Layers | Antenna Gain (dB) |
|---|---|---|---|
| Example 1 | 800 | 13 | 38.6 |
| Example 2 | 370 | 8 | 31.9 |
| Example 3 | 450 | 8 | 33.5 |
| Example 4 | 800 | 13 | 38.2 |
| Example 5 | 370 | 8 | 31.6 |
| Example 6 | 800 | 13 | 38.0 |
| Example 7 | 370 | 8 | 31.7 |
| Comparative Example 1 | 370 | 8 | 29.8 |
| Comparative Example 2 | 800 | 13 | 35.8 |

From the results shown in Table 21, it will be appreciated that the 8-layered dielectric lens according to the present invention (Examples 2, 5 and 7) have a significantly greater antenna gain as compared with the 8-layered dielectric lens of Comparative Example 1 in which the ceramic content (g/cm$^3$) of the 6th layer is greater than that of the 5th layer. Also, the 13-layered dielectric lens according to the present invention (Examples 1, 4 and 6) have a significantly greater antenna gain as compared with the 13-layered dielectric lens of Comparative Example 2 in which the ceramic content (g/cm3) gradually increases from the 9th layer to the 11th layer.

The antenna gain of the dielectric lens of Example 5, in which the 5th layer has a ceramic content (g/cm$^3$) similar to the 4th layer, is slightly lower than that of Example 2. The antenna gain of the dielectric lens of Example 6, in which the 8th layer has a standard deviation in the apparent density is 0.05 g/cm$^3$, is slightly lower than that of Example 4. The antenna gain of the dielectric lens of Example 7, in which the 5th layer has a V/N ratio does not fall within the range of 0.2 to 1.0, is slightly lower than that of Example 2. The antenna gain of the dielectric lens of Example 1, in which the fibrous ceramic is used, is slightly greater than that of Example 4 in which the spherical ceramic is used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The invention claimed is:

1. A hemispherical dielectric lens comprising:
a hemispherical center layer having a hemispherical outer surface; and
a plurality of hemispherical dome-shaped layers each having concentric hemispherical inner and outer surfaces, the outer surfaces of said center layer and dome-shaped layers having different diameters and the inner surfaces of said dome-shaped layers having different diameters,
said center layer and dome-shaped layers being successively concentrically fitted into one another and integrated into a hemispherical shape,
said center layer being a foam molding of ceramic-containing thermoplastic resin expanded beads,
each of said dome-shaped layers being a foam molding of thermoplastic resin expanded beads containing 0 to 80% by weight of a ceramic,
wherein the ceramic content per unit volume of said center and dome-shaped layers decreases from said center layer to the outermost dome-shaped layer,
wherein each of said center and dome-shaped layers has a standard deviation of the apparent density of 0.07 g/cm$^3$ or lower, and
wherein the ratio (V/N) of the number of voids (V) to the number of expanded beads (N) at a region adjacent to the outer surface of said center layer or adjacent to the outer and inner surfaces of each of said dome-shaped layers except said outermost dome-shaped layer is in the range of 0.2 to 1.0.

2. A dielectric lens as recited in claim 1, wherein said ceramic comprises titanium oxide as the major component thereof and is in the form of fibers having an average maximum diameter of 0.01 to 30 μm and an average length of 0.1 to 100 μm or in the form of particles having an average maximum length of 0.01 to 100 μm.

3. A dielectric lens as recited in claim 1, wherein those layers of said center and dome-shaped layers which contain the ceramic each contain a carboxylic acid-modified thermoplastic polymer.

4. A dielectric lens as recited in claim 1, wherein the dielectric lens has an overall apparent density of 0.03 to 1.2 g/cm$^3$.

5. A dielectric lens as recited in claim 1, wherein said thermoplastic resin of each of said center and dome-shaped layers is a polyolefin resin.

6. A dielectric lens as recited in claim 1, wherein the apparent density of said center layer and said dome-shaped layers decreases from said center layer to the outermost dome-shaped layer.

7. A dielectric lens as recited in claim 1, wherein the total number Z of the center layer and dome-shaped layers is 5 to 41 and wherein said center layer and dome-shaped layers have the same kind or 2 to 7 different kinds of percent by weight ceramic contents when Z is 8 to 41 or have the same kind or 2 to (Z−1) different kinds of percent by weight ceramic contents when Z is 5 to 7.

8. A spherical dielectric lens comprising:
a spherical core having a spherical outer surface; and
a plurality of hollow spherical shells each having concentric spherical inner and outer surfaces, the outer surfaces of said core and shells having different diameters and the inner surfaces of said shells having different diameters,
said core and shells being concentrically disposed and integrated into a spherical shape,
said core being a foam molding of ceramic-containing thermoplastic resin expanded beads,
each of said shells being a foam molding of thermoplastic resin expanded beads containing 0 to 80% by weight of a ceramic,
wherein the ceramic content per unit volume of said core and shells decreases from said core to the outermost shell, and
wherein each of said core and shells has a standard deviation of the apparent density of 0.07 g/cm$^3$ or lower wherein the ratio (V/N) of the number of voids (V) to the number of expanded beads (N) at a region adjacent to the outer surface of said center larger or adjacent to the outer and inner surfaces of each of said dome-shaped layers except said outermost dome-shaped layer is in the range 0.2 to 1.0.

* * * * *